US010027873B2

(12) United States Patent
Brav et al.

(10) Patent No.: US 10,027,873 B2
(45) Date of Patent: Jul. 17, 2018

(54) DEVICES, METHODS AND SYSTEMS FOR VISUAL IMAGING ARRAYS

(71) Applicant: Elwha LLC, Bellevue, WA (US)

(72) Inventors: Ehren Brav, Bainbridge Island, WA (US); Russell Hannigan, Sammamish, WA (US); Roderick A. Hyde, Redmond, WA (US); Muriel Y. Ishikawa, Livermore, CA (US); 3ric Johanson, Seattle, WA (US); Jordin T. Kare, San Jose, CA (US); Tony S Pan, Bellevue, WA (US); Phillip Rutschman, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: The Invention Science Fund II, LLC, Bellevue, WA (US)

( * ) Notice: Subject to any disclaimer, the term of this patent is extended or adjusted under 35 U.S.C. 154(b) by 0 days.

(21) Appl. No.: 14/714,239

(22) Filed: May 15, 2015

(65) Prior Publication Data
US 2016/0142612 A1     May 19, 2016

Related U.S. Application Data

(60) Provisional application No. 62/081,559, filed on Nov. 18, 2014, provisional application No. 62/081,560, filed on Nov. 18, 2014, provisional application No. 62/082,001, filed on Nov. 19, 2014, provisional application No. 62/082,002, filed on Nov. 19, 2014, provisional application No. 62/156,162, filed on May 1, 2015.

(51) Int. Cl.
*H04N 5/225*     (2006.01)
*H04N 5/232*     (2006.01)

(52) U.S. Cl.
CPC ..... *H04N 5/23206* (2013.01); *H04N 5/23229* (2013.01); *H04N 5/23293* (2013.01); *H04N 5/23296* (2013.01)

(58) Field of Classification Search
CPC .......................... H04N 3/1593; H04N 5/3415
USPC ..................................................... 348/218.1
See application file for complete search history.

(56) References Cited

U.S. PATENT DOCUMENTS

| 5,262,856 A | 11/1993 | Lippman et al. |
| 7,623,152 B1 | 11/2009 | Kaplinsky |
| 7,675,549 B1 * | 3/2010 | Brower ............ H04N 1/00244 348/157 |

(Continued)

FOREIGN PATENT DOCUMENTS

KR     1020110072846     6/2011

OTHER PUBLICATIONS

PCT International Search Report; International App. No. PCT/US 15/61439; dated Mar. 7, 2016; pp. 1-2

(Continued)

*Primary Examiner* — Twyler Lamb Haskins
*Assistant Examiner* — Dwight Alex C Tejano

(57) ABSTRACT

A method substantially as shown and described the detailed description and/or drawings and/or elsewhere herein. A device substantially as shown and described the detailed description and/or drawings and/or elsewhere herein.

28 Claims, 47 Drawing Sheets

(56) References Cited

U.S. PATENT DOCUMENTS

| | | | |
|---|---|---|---|
| 7,720,282 B2 | 5/2010 | Blake et al. | |
| 7,733,371 B1 | 6/2010 | Monroe | |
| 2002/0092029 A1* | 7/2002 | Smith | H04N 1/32776 725/105 |
| 2003/0025803 A1* | 2/2003 | Nakamura | H04N 5/23203 348/218.1 |
| 2004/0010803 A1 | 1/2004 | Berstis | |
| 2005/0157173 A1* | 7/2005 | Kurebayashi | H04N 5/232 348/207.11 |
| 2006/0125921 A1* | 6/2006 | Foote | G06T 3/4038 348/159 |
| 2007/0030353 A1 | 2/2007 | Novak | |
| 2007/0126863 A1 | 6/2007 | Prechtl et al. | |
| 2007/0171301 A1 | 7/2007 | Tatsumi | |
| 2007/0182819 A1* | 8/2007 | Monroe | G08B 13/19628 348/143 |
| 2007/0279494 A1 | 12/2007 | Aman et al. | |
| 2008/0036864 A1 | 2/2008 | McCubbrey et al. | |
| 2008/0036875 A1 | 2/2008 | Jones et al. | |
| 2008/0143842 A1* | 6/2008 | Gillard | G03B 37/04 348/218.1 |
| 2008/0309970 A1 | 12/2008 | Kobayashi | |
| 2009/0251530 A1 | 10/2009 | Cilia | |
| 2010/0053443 A1 | 3/2010 | Tsukagoshi | |
| 2010/0123872 A1 | 5/2010 | Aikawa et al. | |
| 2010/0304731 A1 | 12/2010 | Bratton et al. | |
| 2011/0164108 A1 | 7/2011 | Bates et al. | |
| 2012/0169842 A1* | 7/2012 | Chuang | G08B 13/19619 348/39 |
| 2012/0274899 A1 | 11/2012 | Wang et al. | |
| 2013/0070047 A1* | 3/2013 | DiGiovanni | H04N 5/222 348/36 |
| 2013/0141523 A1 | 6/2013 | Banta et al. | |
| 2013/0321635 A1 | 12/2013 | Finn et al. | |
| 2015/0211870 A1 | 7/2015 | Nickolaou | |
| 2016/0213249 A1 | 7/2016 | Cornsweet et al. | |

OTHER PUBLICATIONS

PCT International Search Report; International App. No. PCT/US2015/061389; dated Feb. 23, 2016; pp. 1-3.

PCT International Search Report; International App. No. PCT/US2015/061384; dated Feb. 23, 2016; pp. 1-4.

Samaneigo et al.; "A Portable, Scalable Retinal Imaging System"; TI Engibous Competition Report; Rice University; Spring 2012; pp. 1-96; mobileVision.

PCT International Search Report; International App. No. PCT/US2017/050498; dated Dec. 15, 2017; pp. 1-3.

* cited by examiner

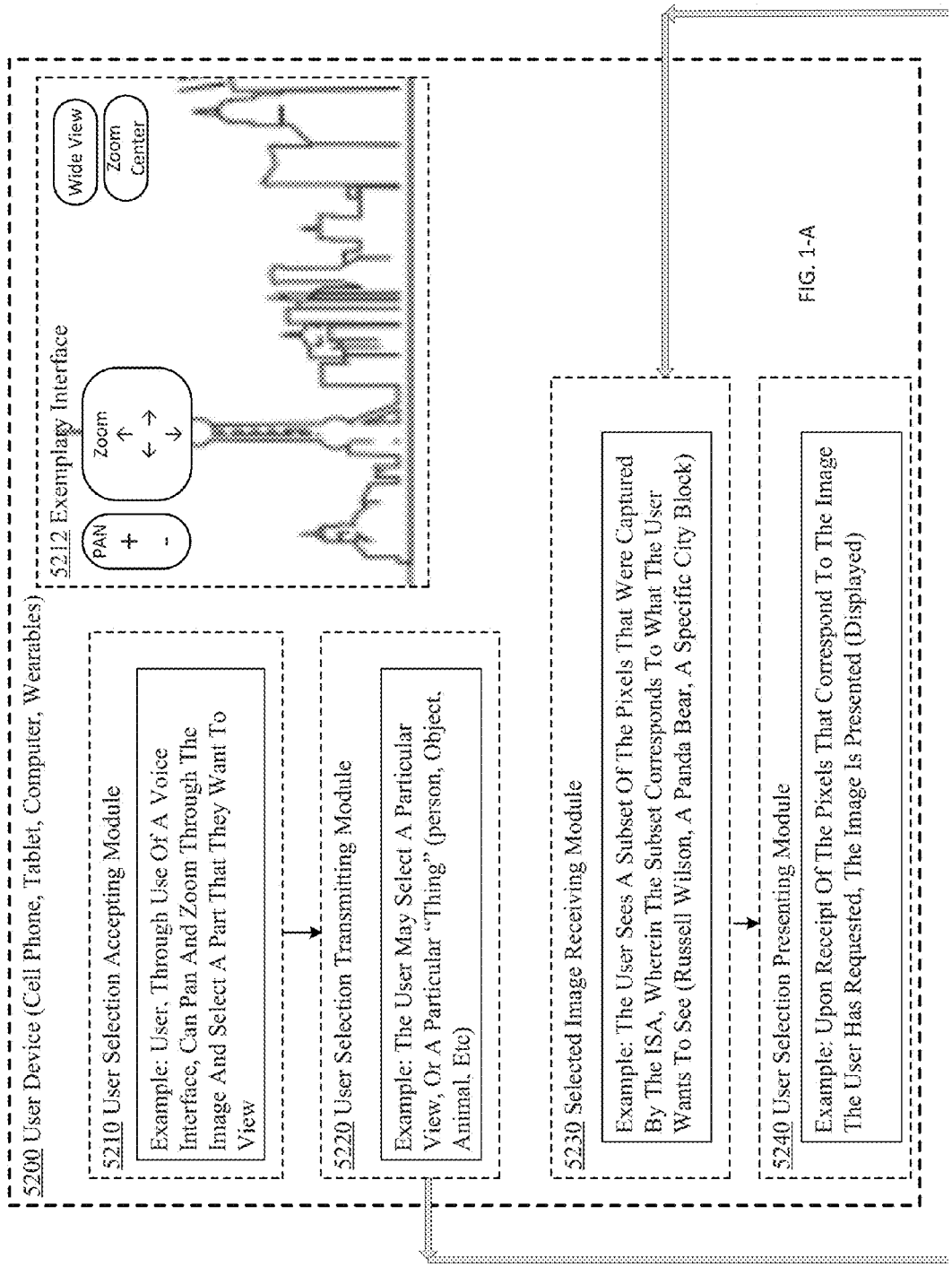

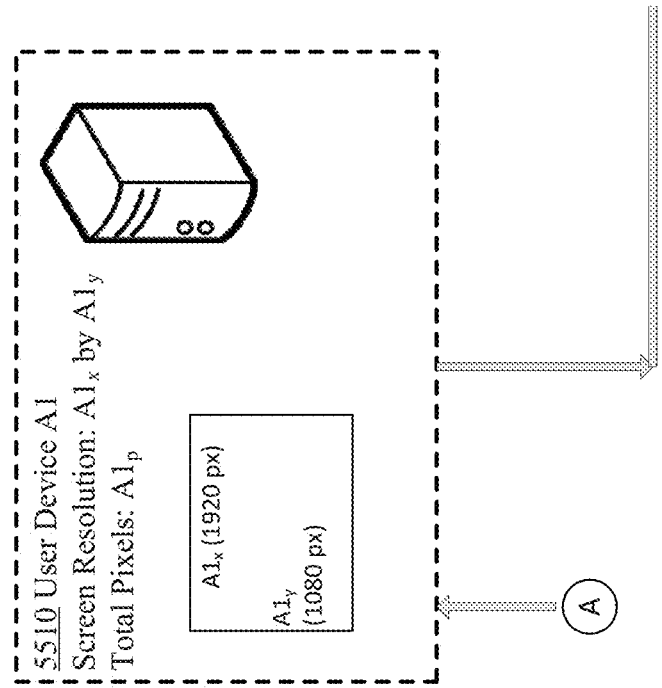
FIG. 1-B

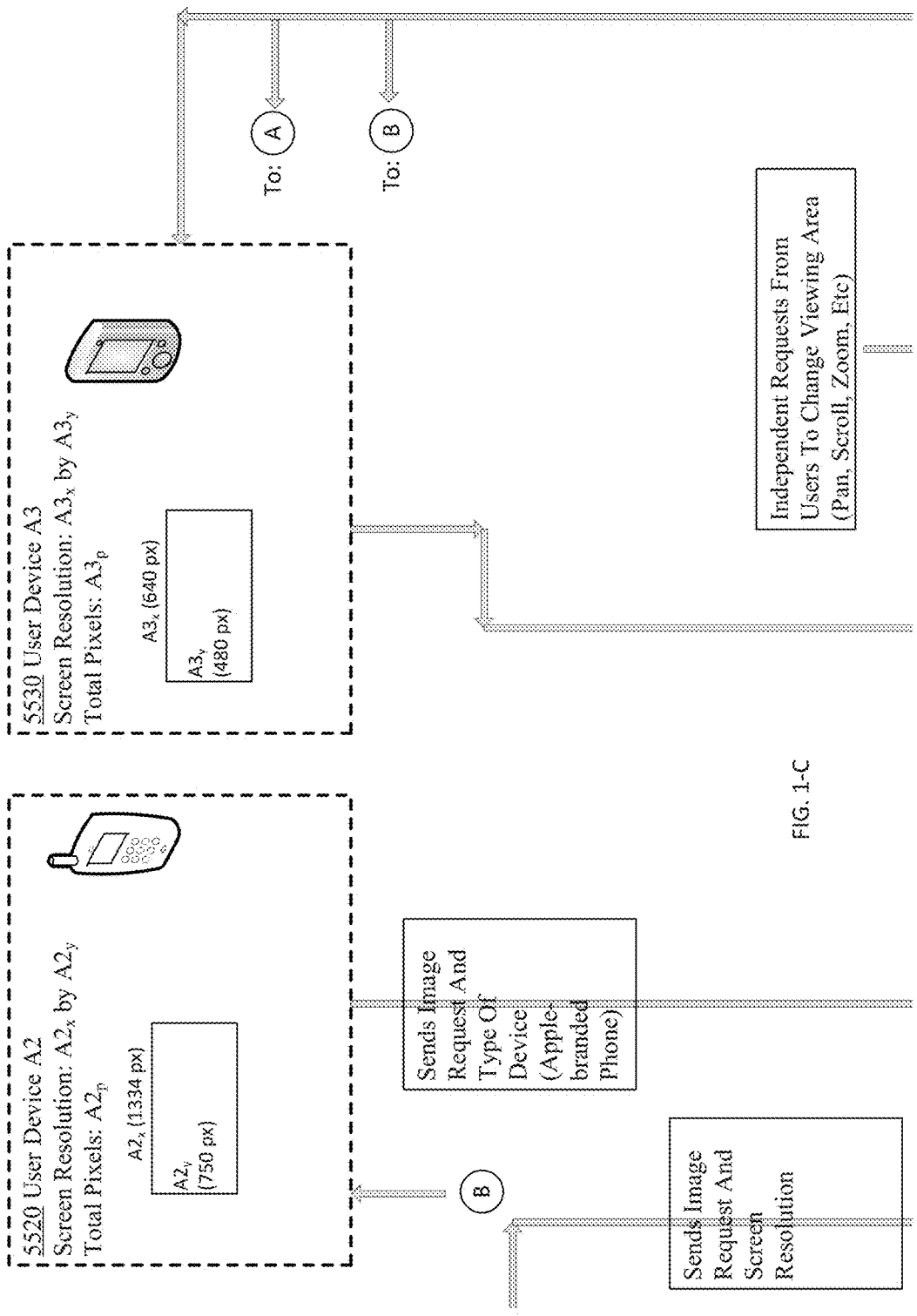
FIG. 1-C

| FIG. 1-A | FIG. 1-B | FIG. 1-C | FIG. 1-D | FIG. 1-E | FIG. 1-F | FIG. 1-G | FIG. 1-H | FIG. 1-I | FIG. 1-J |
| FIG. 1-K | FIG. 1-L | FIG. 1-M | FIG. 1-N | FIG. 1-O | FIG. 1-P | FIG. 1-Q | FIG. 1-R | FIG. 1-S | FIG. 1-T |
| FIG. 1-U | FIG. 1-V | FIG. 1-W | FIG. 1-X | FIG. 1-Y | FIG. 1-Z | FIG. 1-AA | FIG. 1-AB | FIG. 1-AC | FIG. 1-AD |
| FIG. 1-AE | FIG. 1-AF | FIG. 1-AG | FIG. 1-AH | FIG. 1-AI | FIG. 1-AJ | FIG. 1-AK | FIG. 1-AL | FIG. 1-AM | FIG. 1-AN |

There Are No Modules On This Page, But It Is Required To Show The Complete View Of The Entire System. This Page Fits Into Position (1,4) Of The Grid

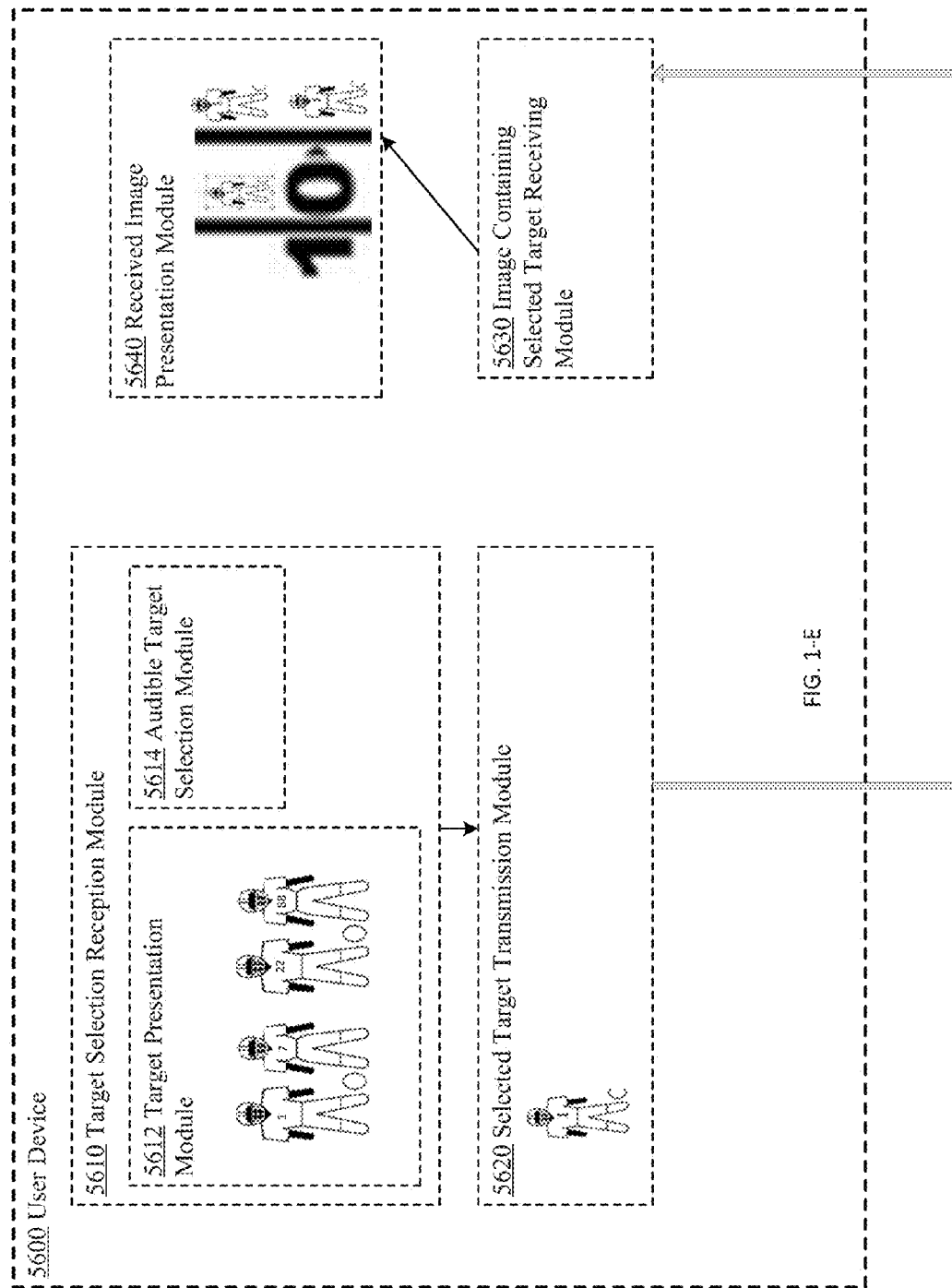
FIG. 1-E

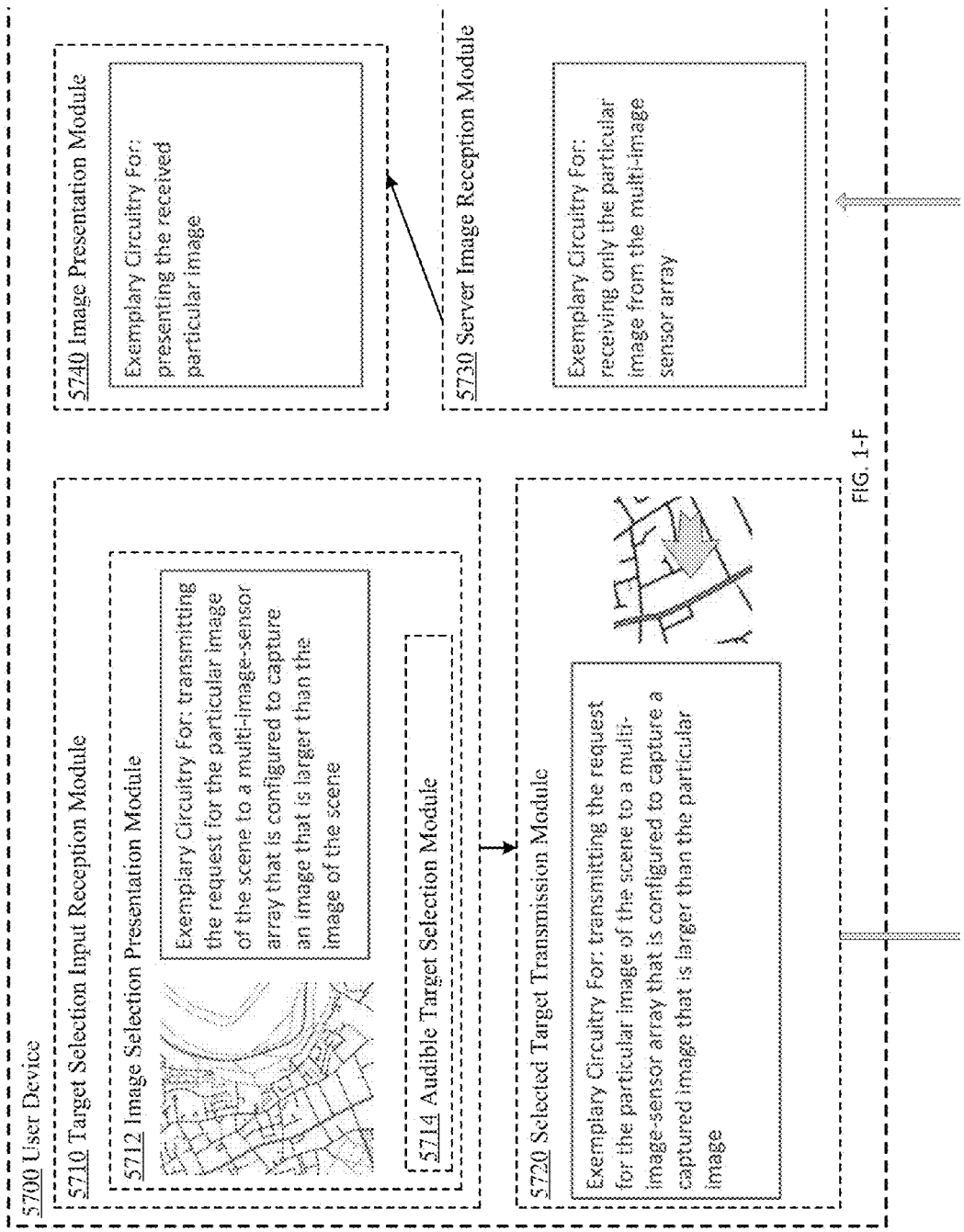
FIG. 1-F

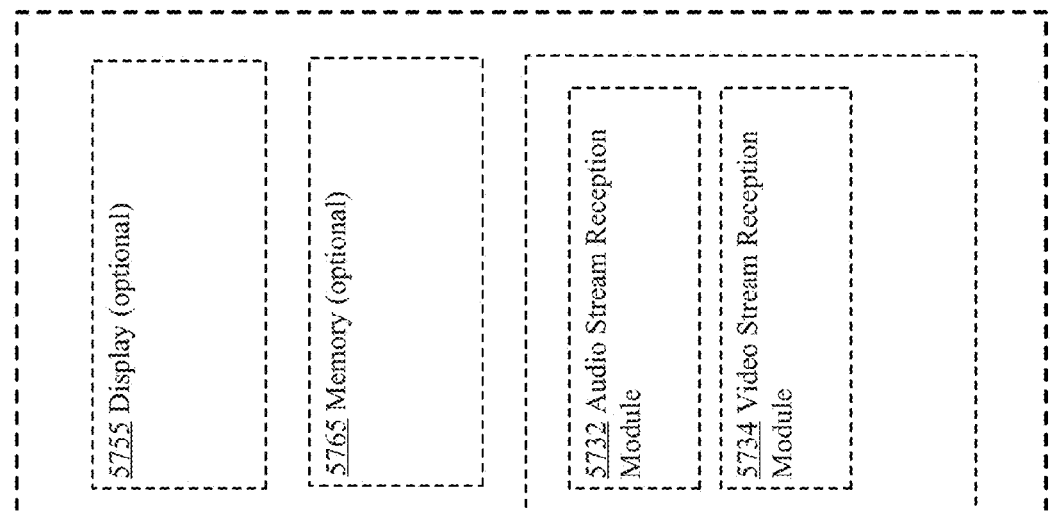
FIG. 1-G

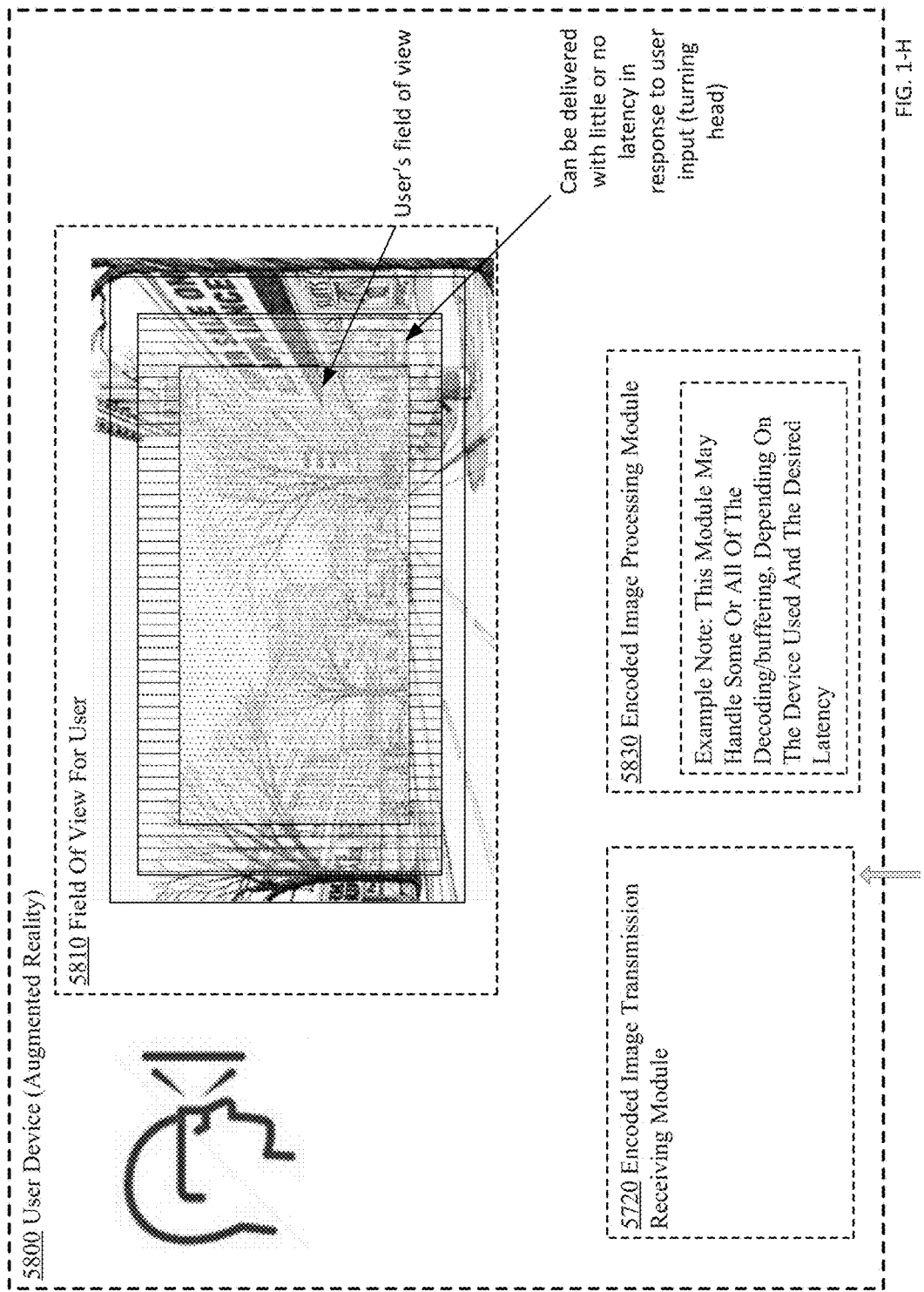
FIG. 1-H

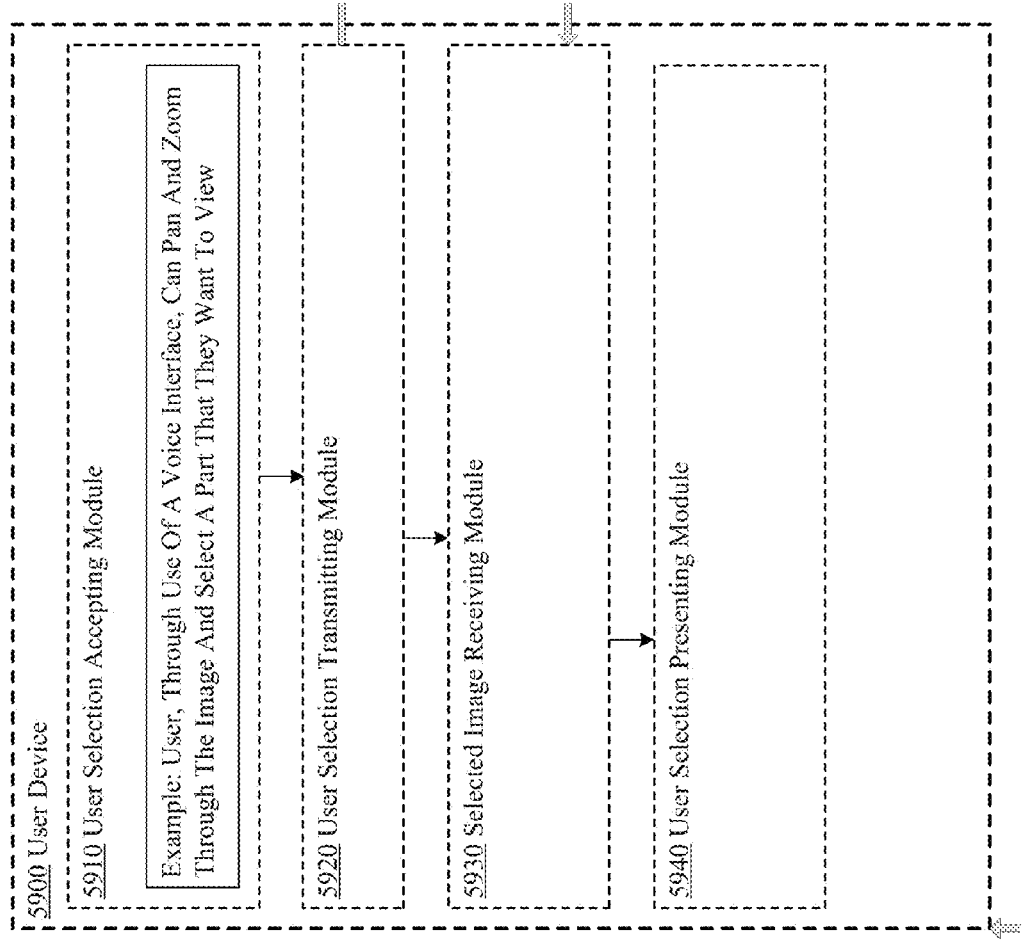

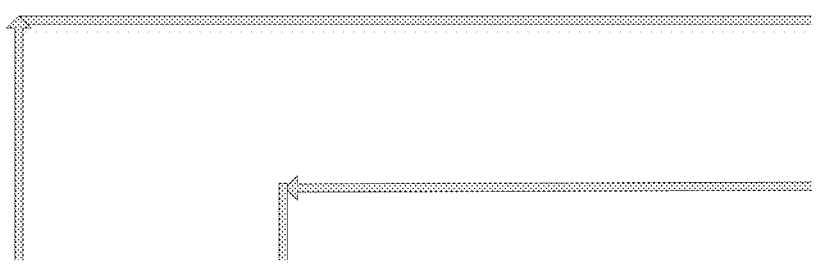
FIG. 1-J

FIG. 1-K

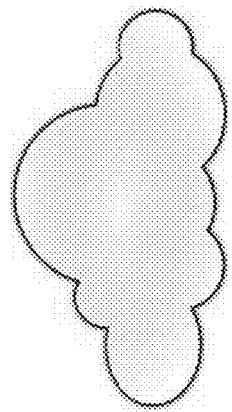

The Request To The Server Also May Include Data About The User Device, Corresponding To What Level Of Service The User Has Paid For, The Max Resolution/framerate Capabilities Of The User Device, Etc.

4000 Server (May Be Remote To ISA)

4010 User Request Reception Module

4020 User Request Validation Module

Example: If The User Is Requesting More Pixels/data Than Their Device Can Handle, The Request Is Modified/rejected 4030 User Request Latency Management Module 4070 User Request Transmission Module

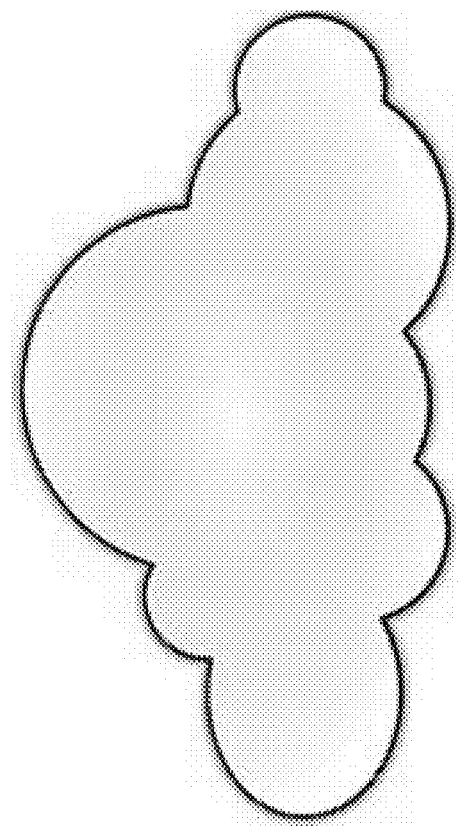
FIG. 1-L

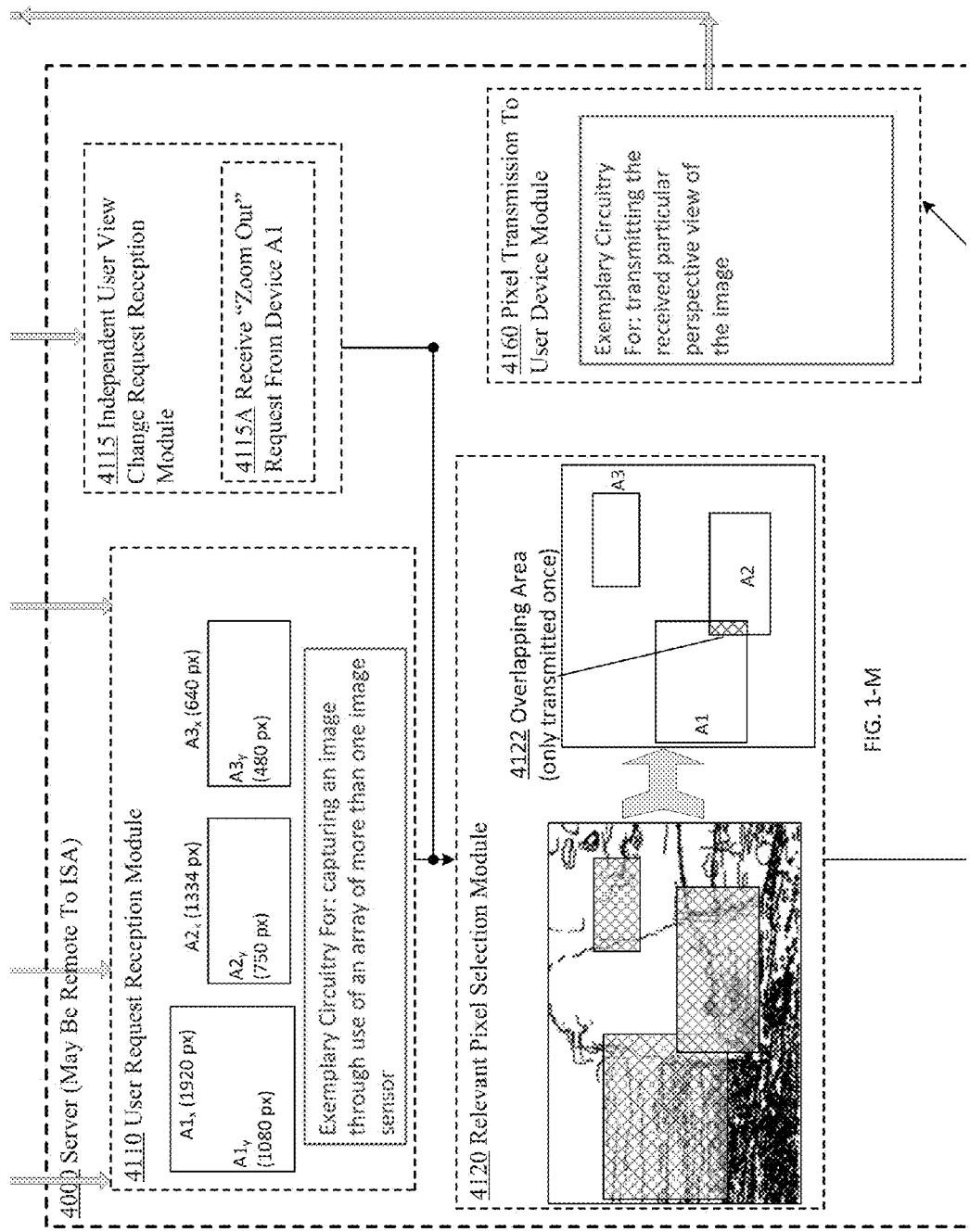
FIG. 1-M

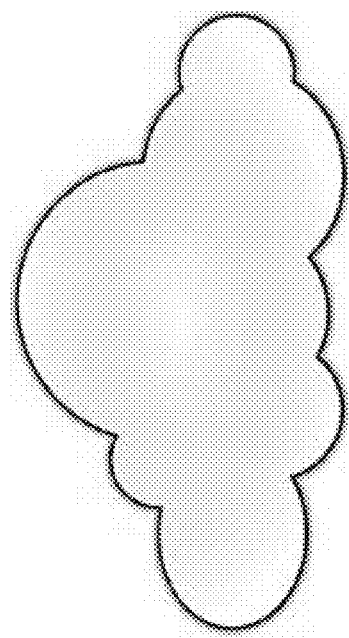
FIG. 1-N

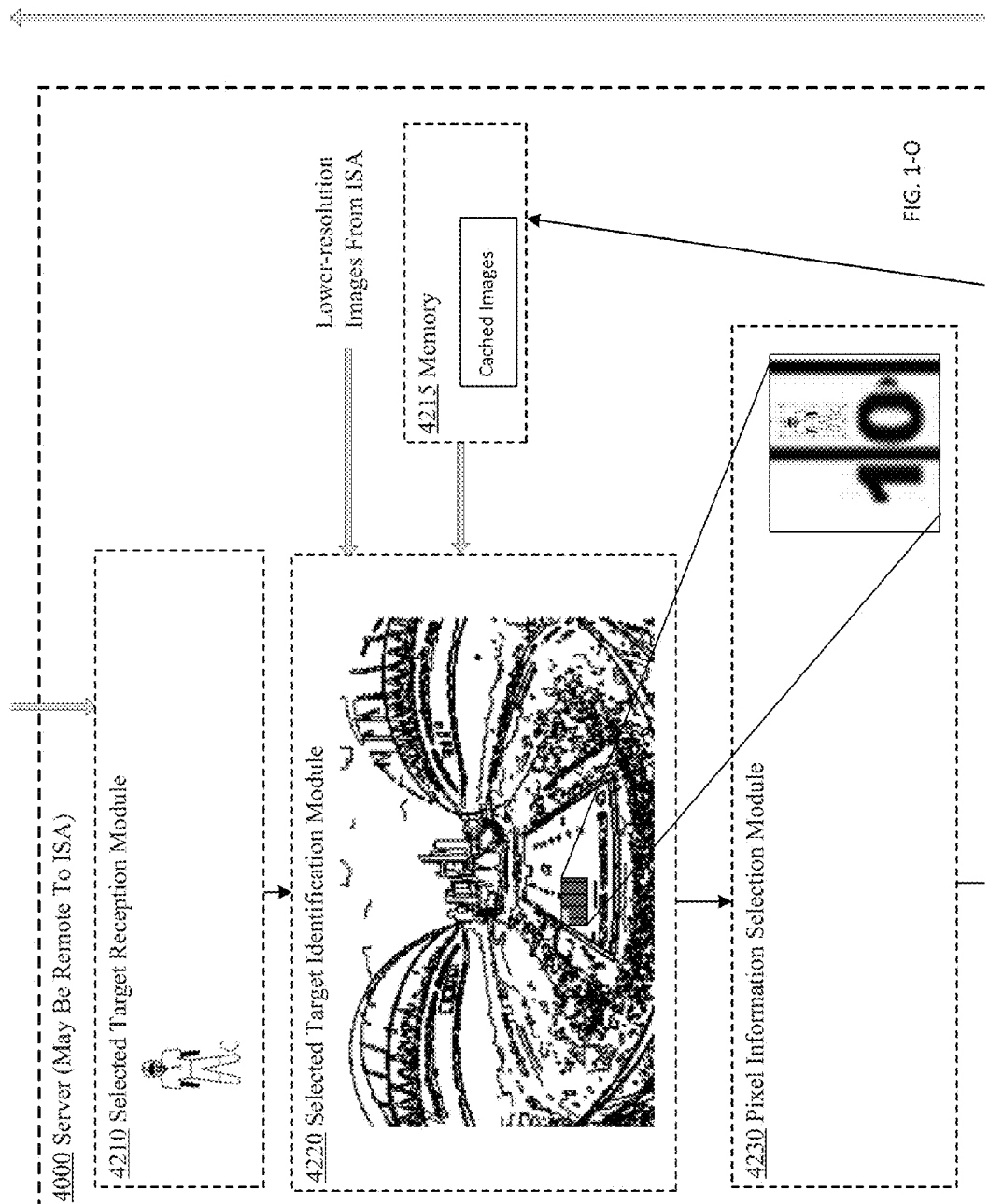

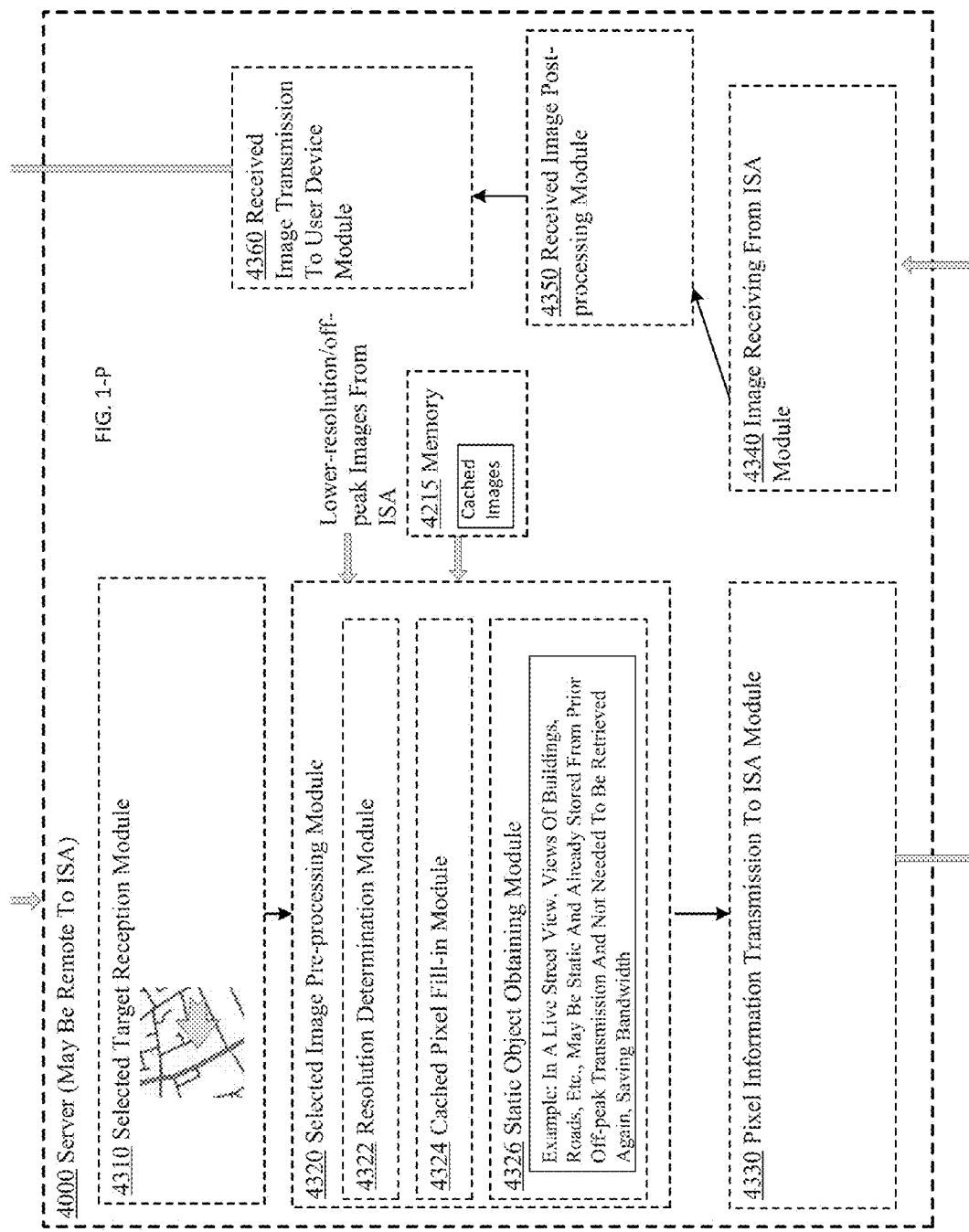

There Are No Modules On This Page, But It Is Required To Show The Complete View Of The Entire System. This Page Fits Into Position (2,7) Of The Grid To Fig. 1-AA To Fig. 1-P

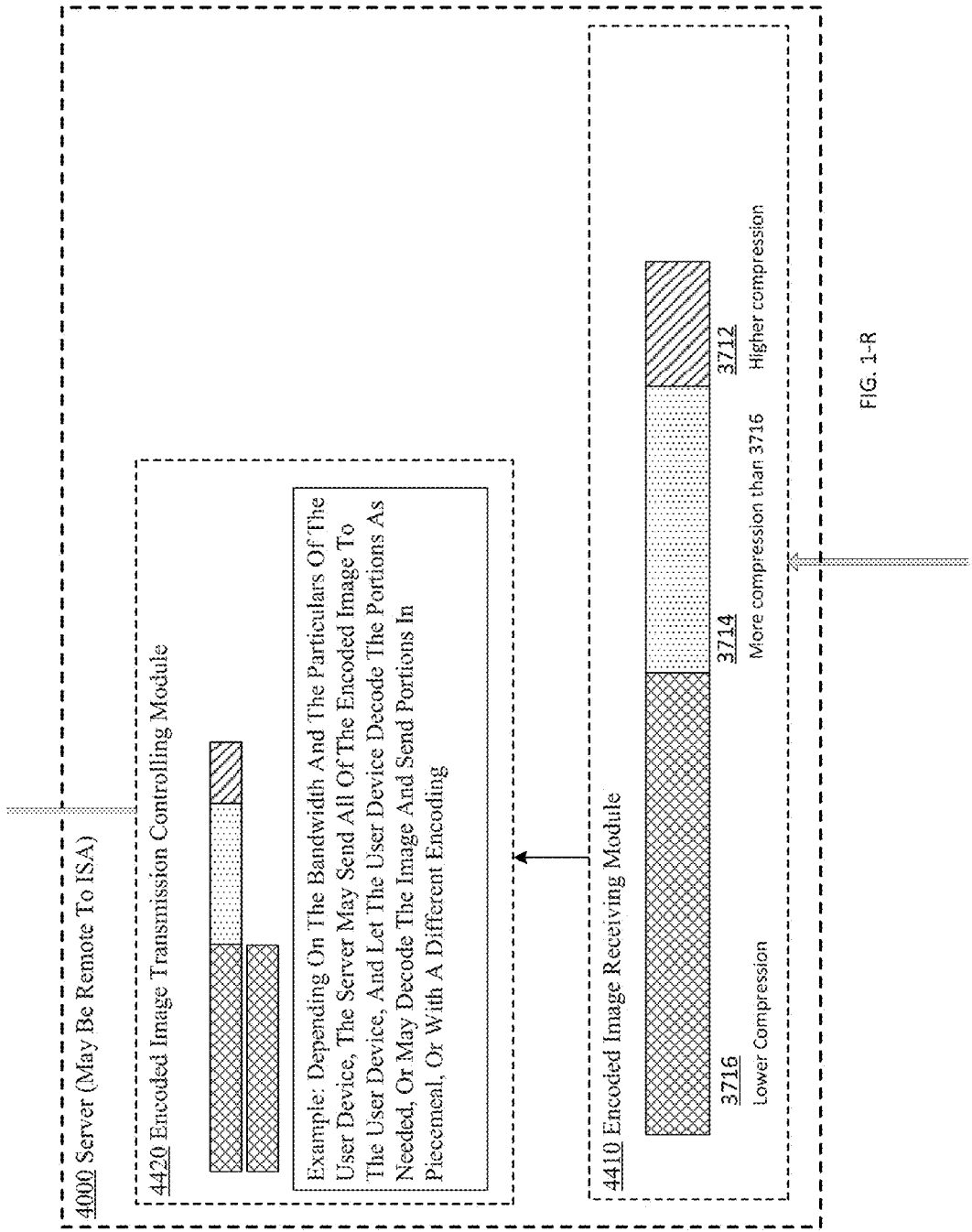

User Data Collection Module 7705 May Actively Or Passively Collect Data From User Device 5900 To Assist In Providing Targeted Ads

FIG. 1-S

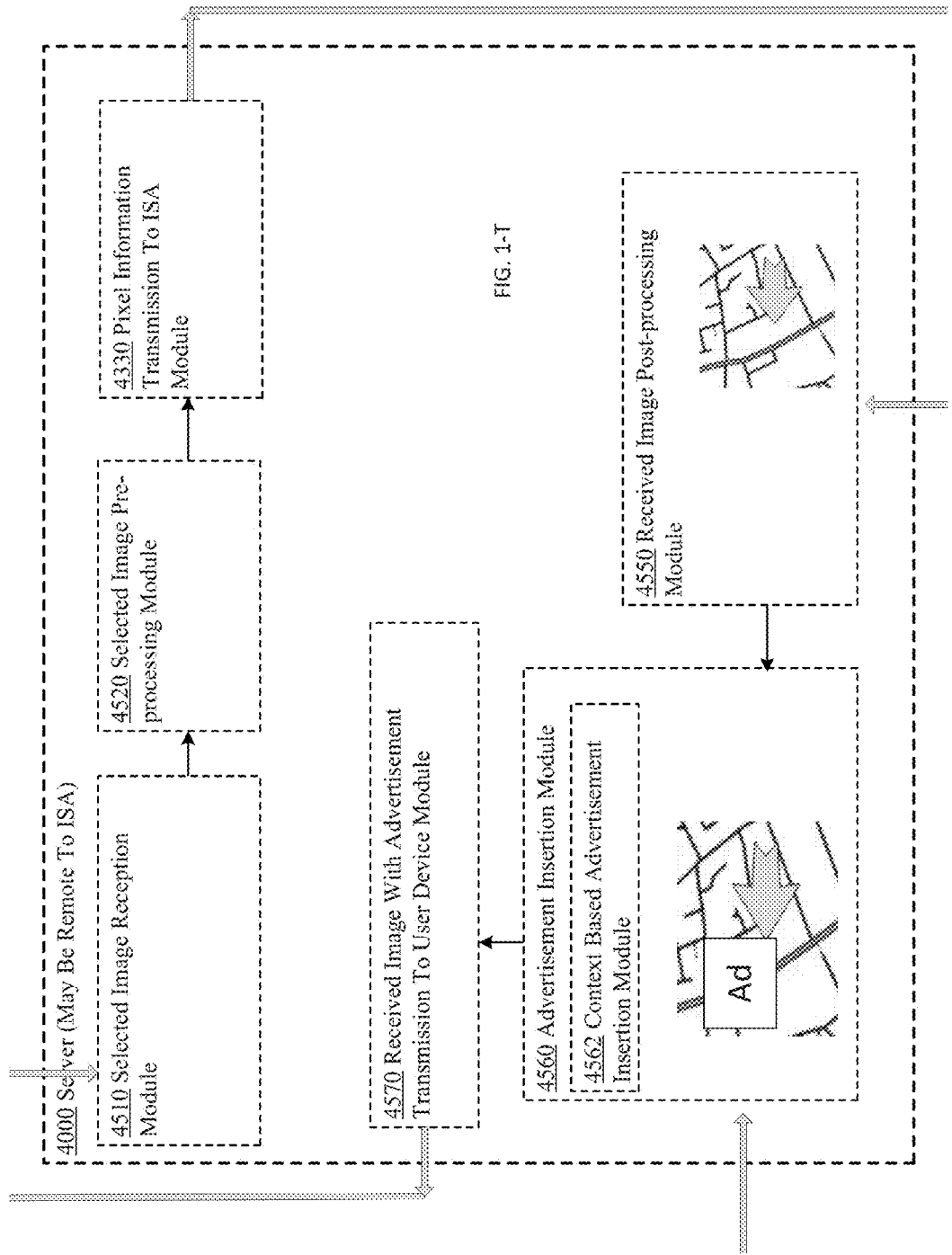
FIG. 1-T

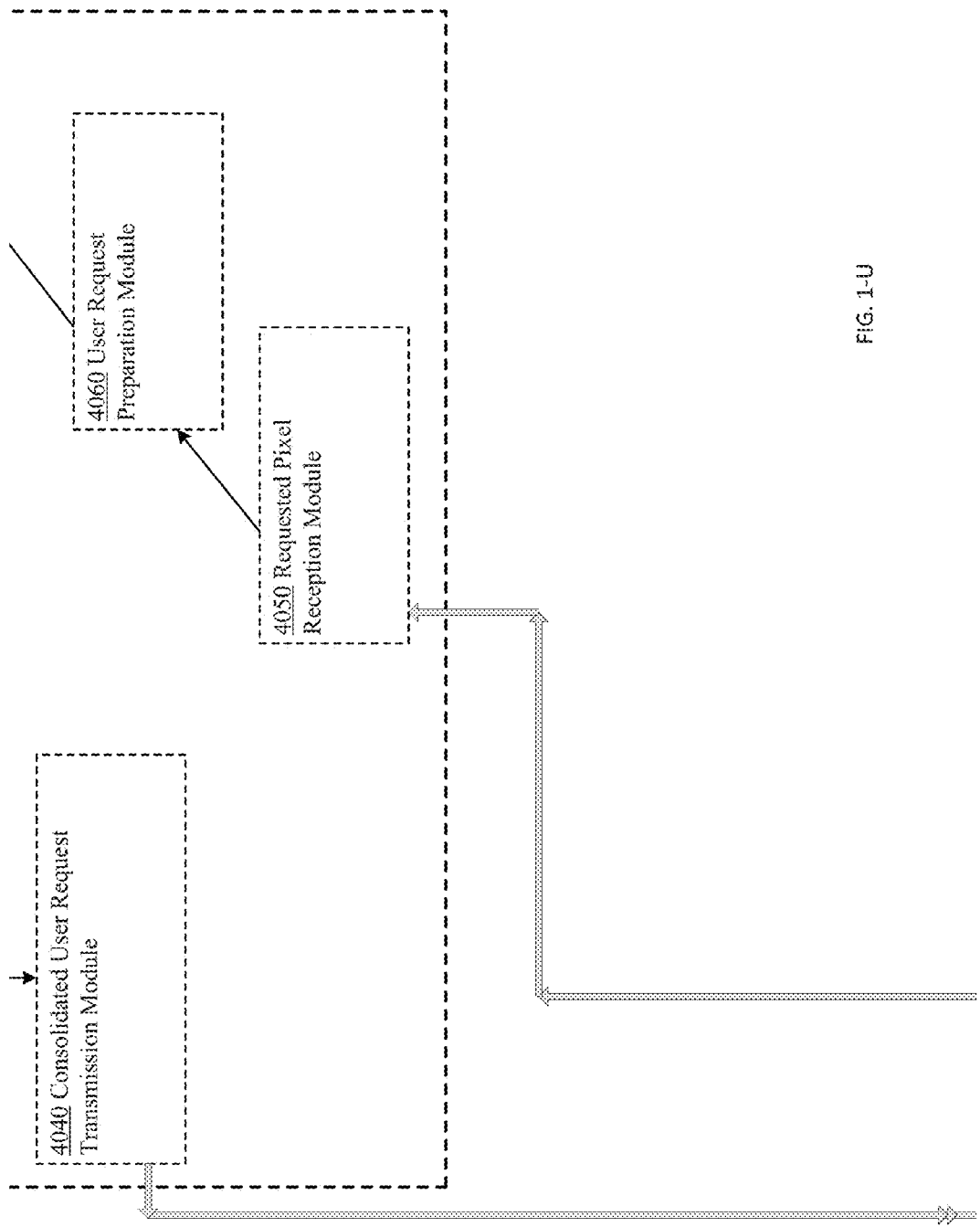

There Are No Modules On This Page, But It Is Required To Show The Complete View Of The Entire System. This Page Fits Into Position (3,2) Of The Grid To Fig. 1-AF →

↓ To Fig. 1-U

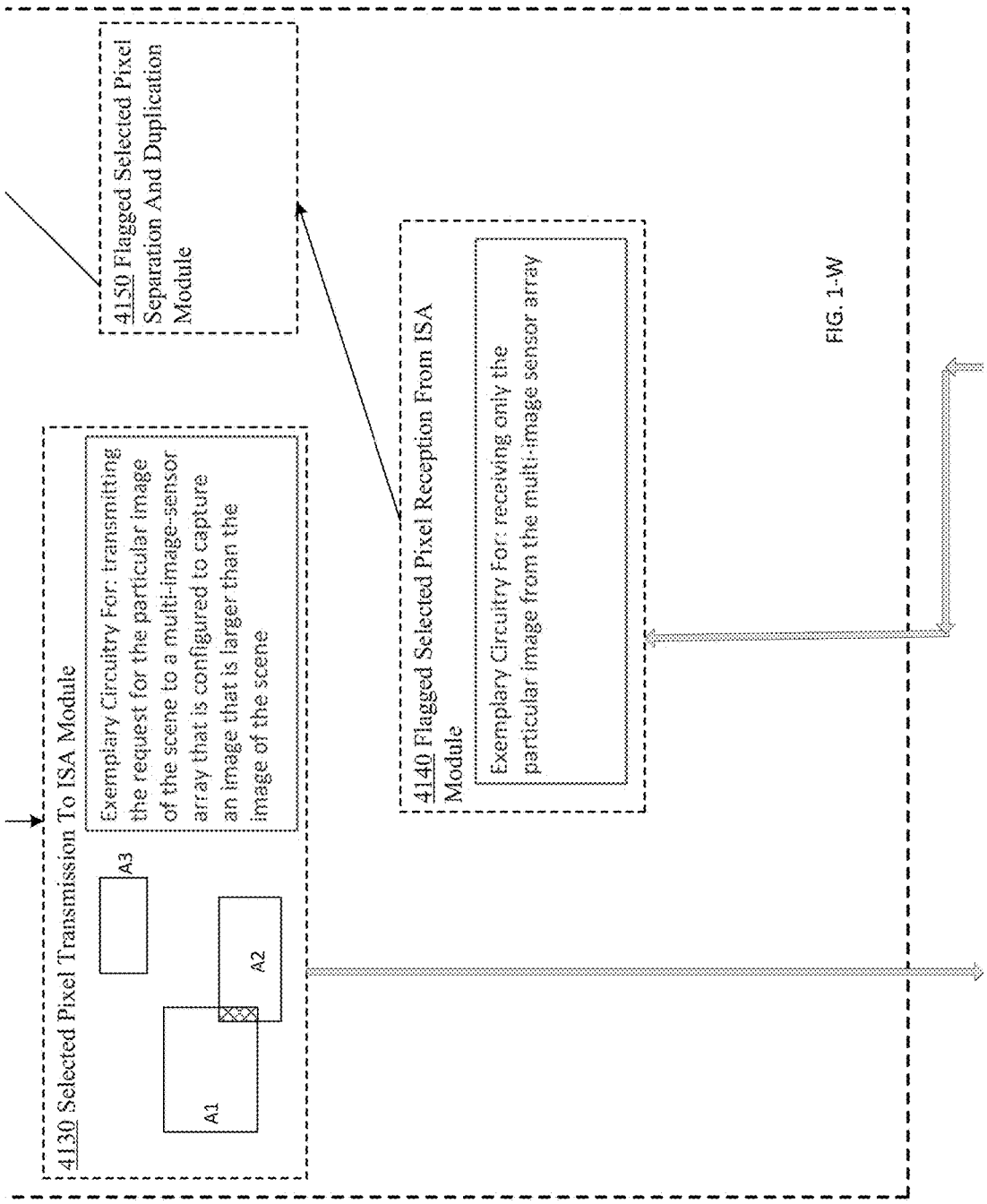

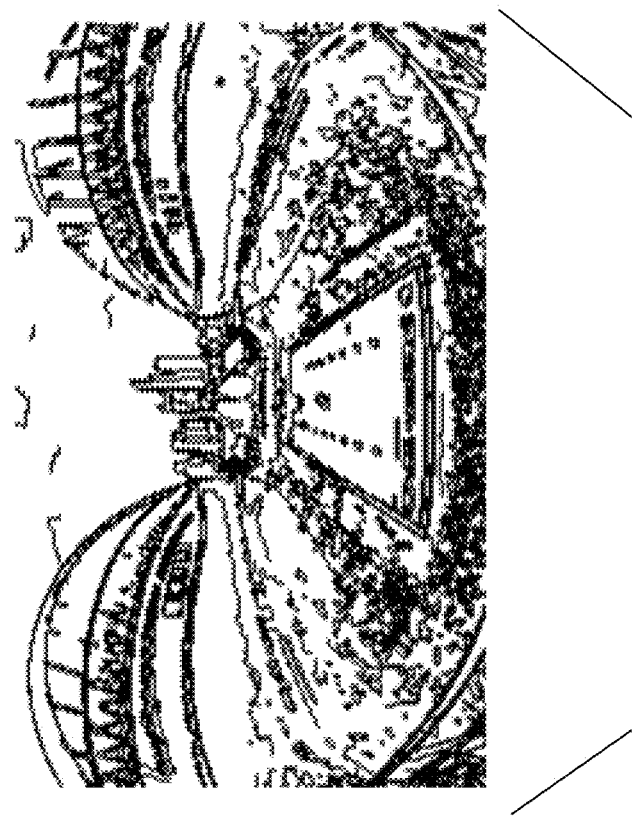
FIG. 1-X

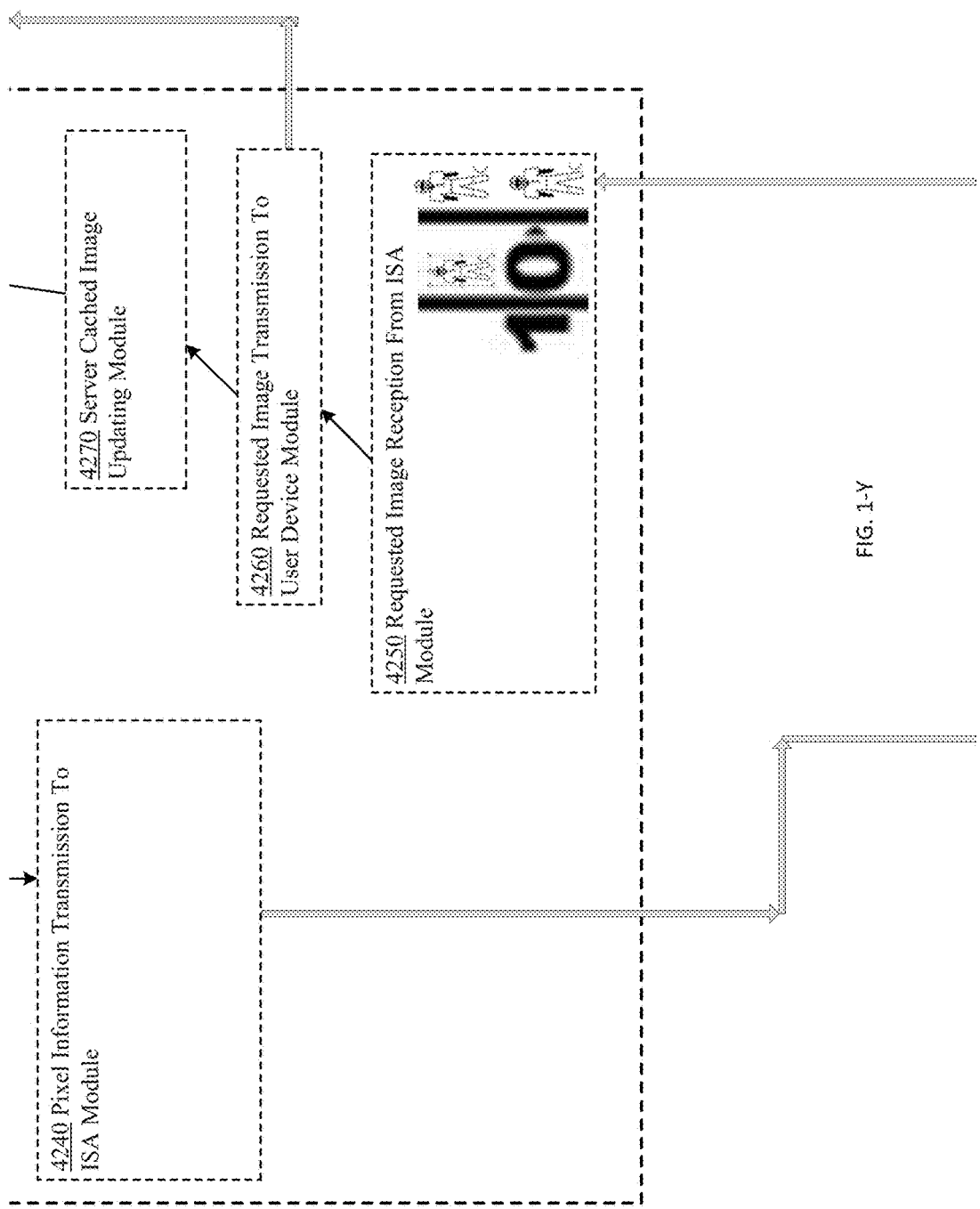
FIG. 1-Y

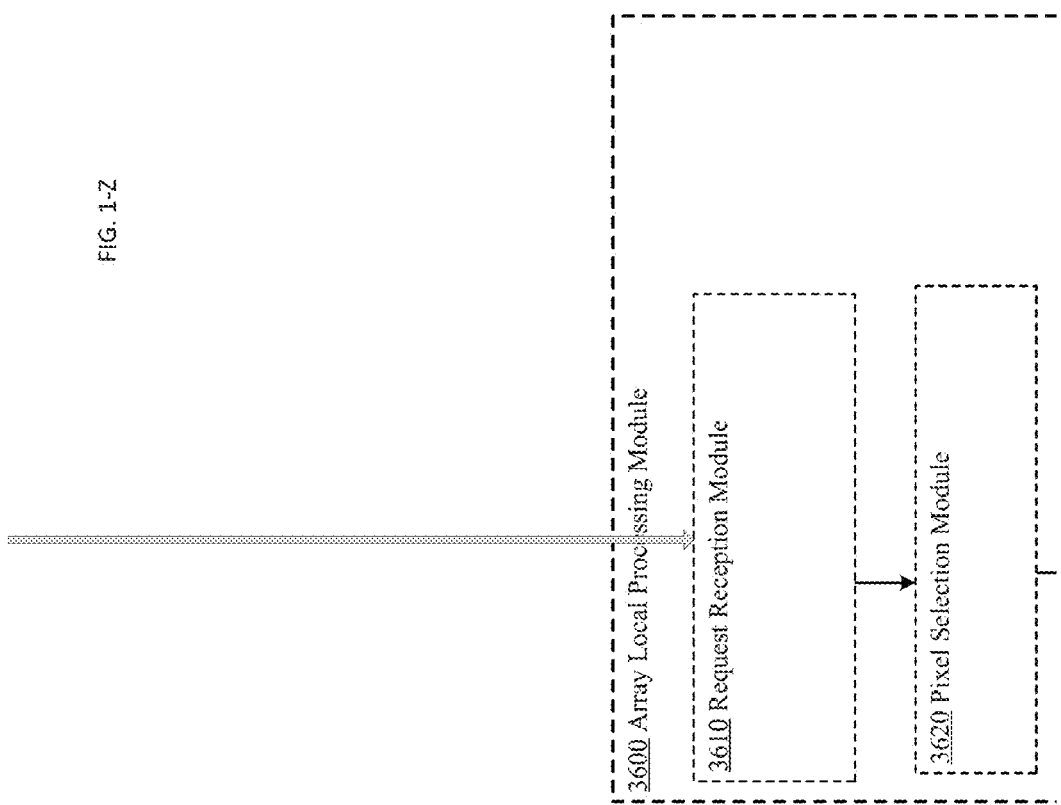

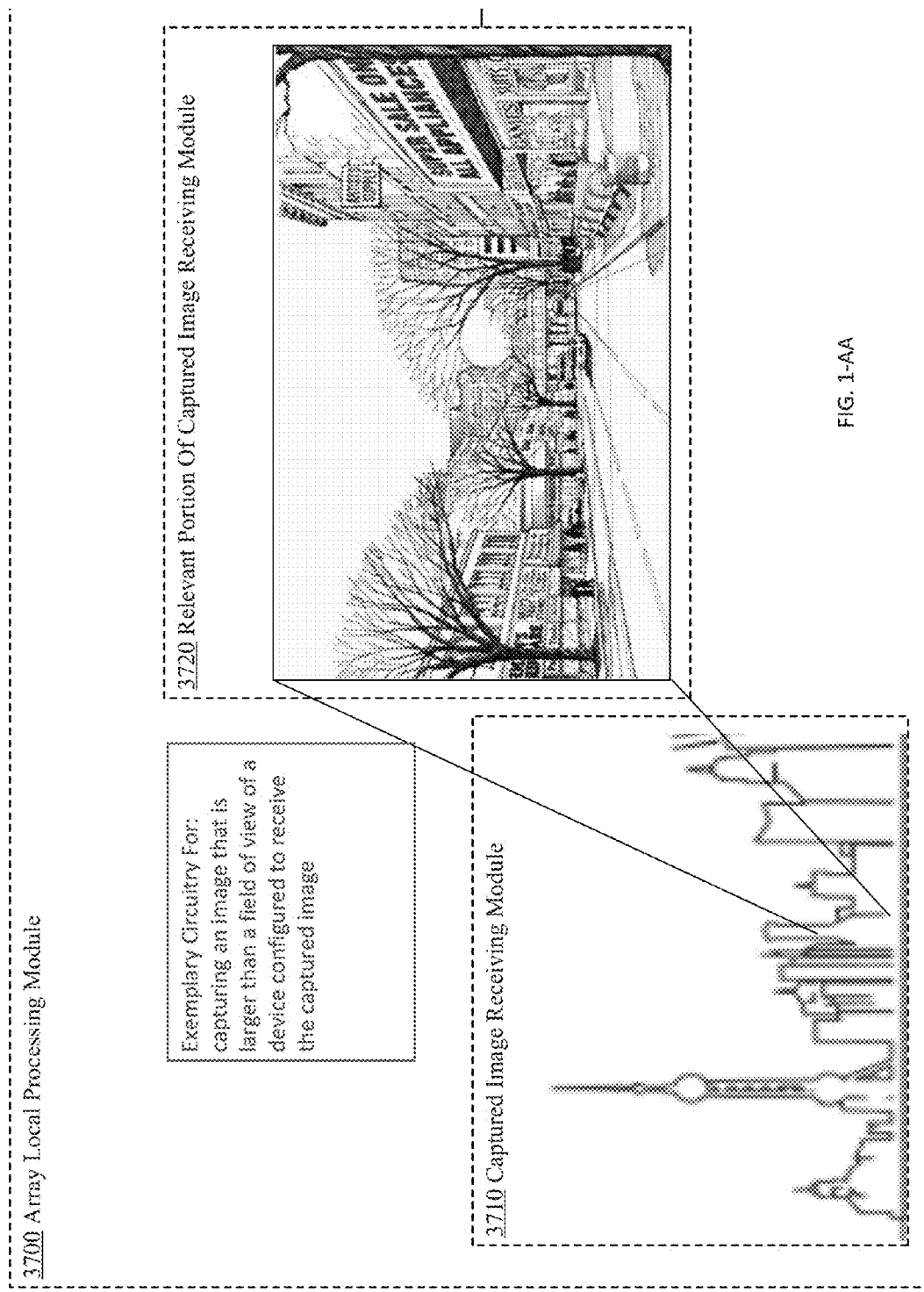
FIG. 1-AA

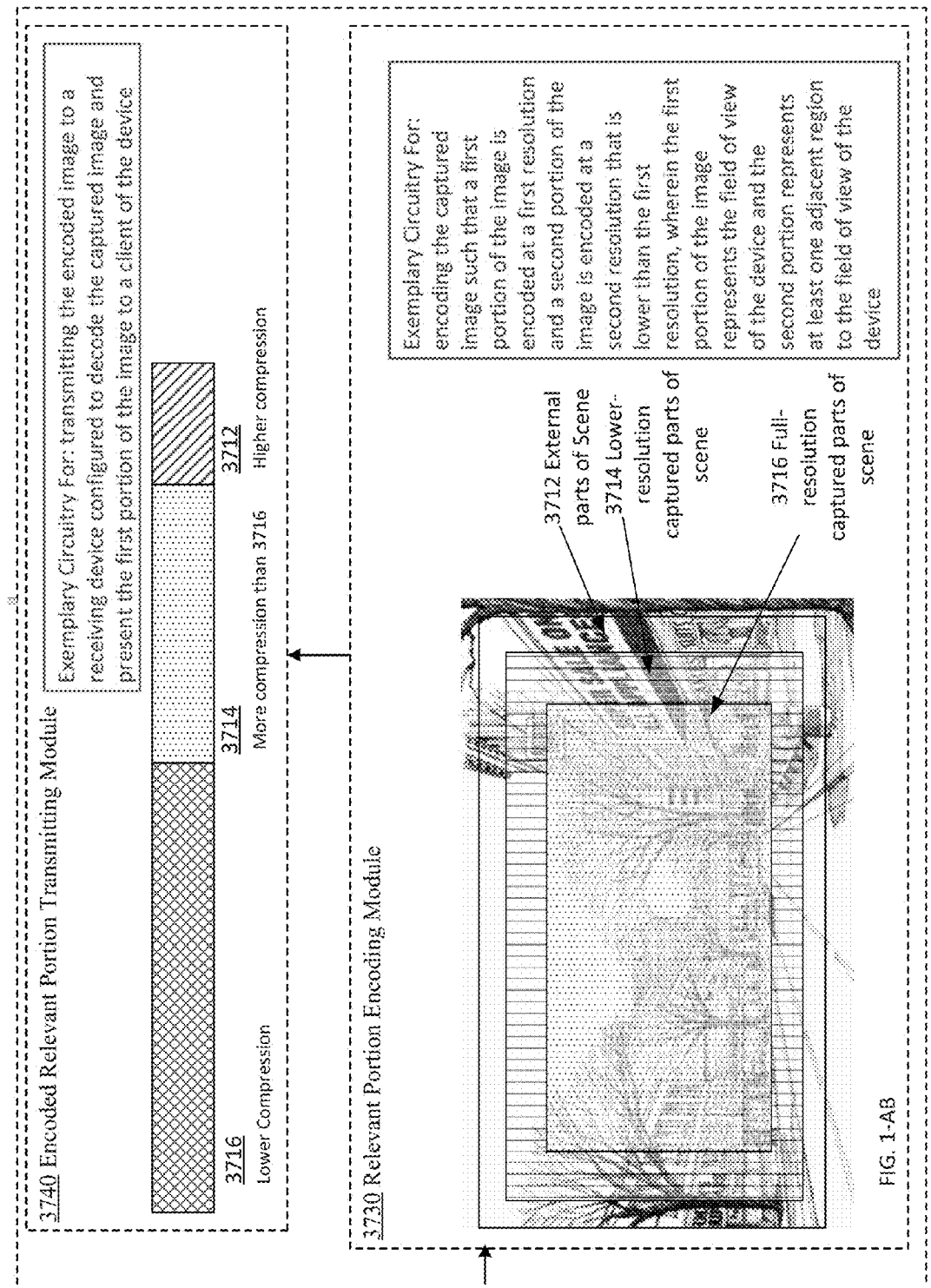
FIG. 1-AB

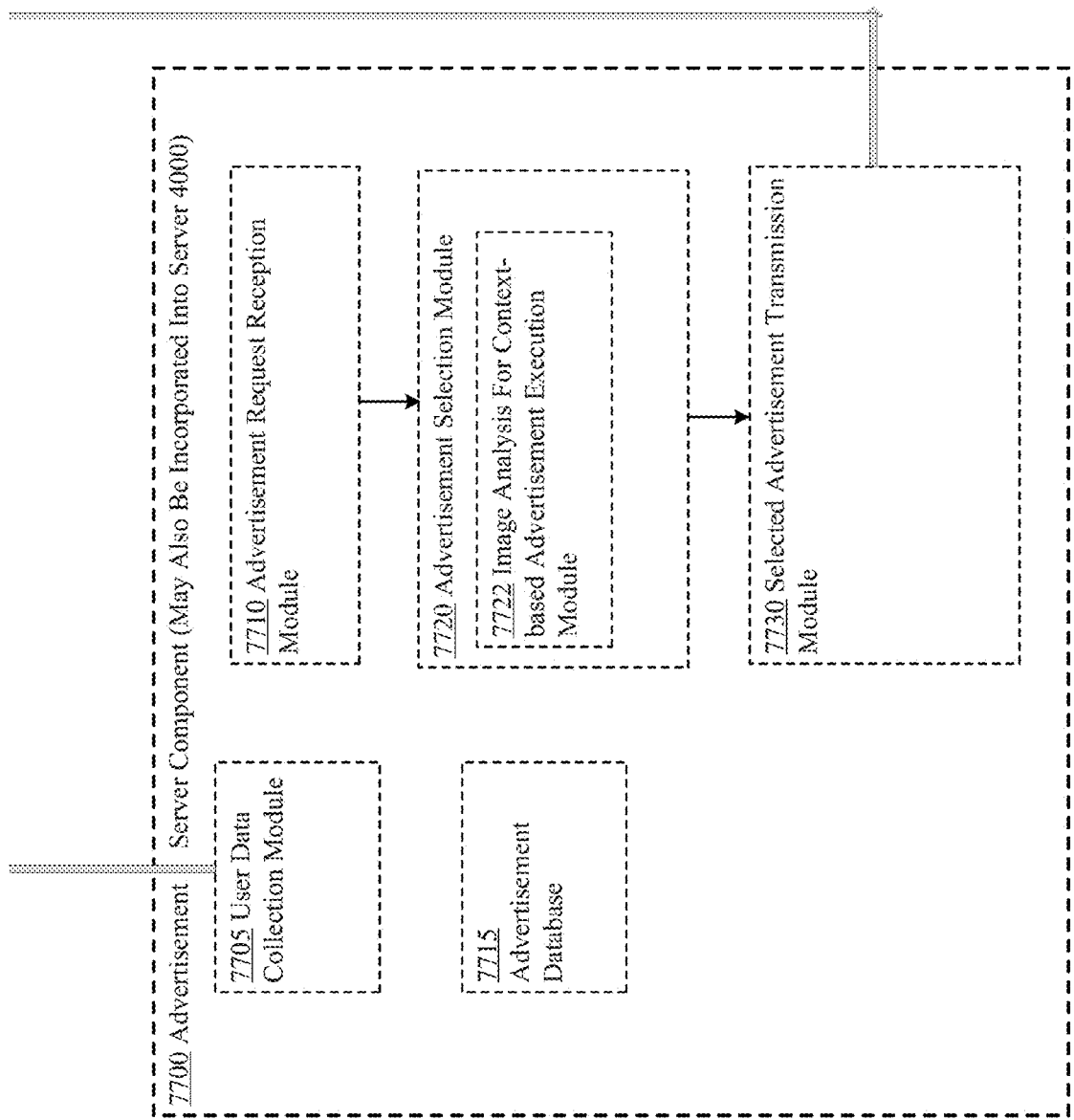
FIG. 1-AC

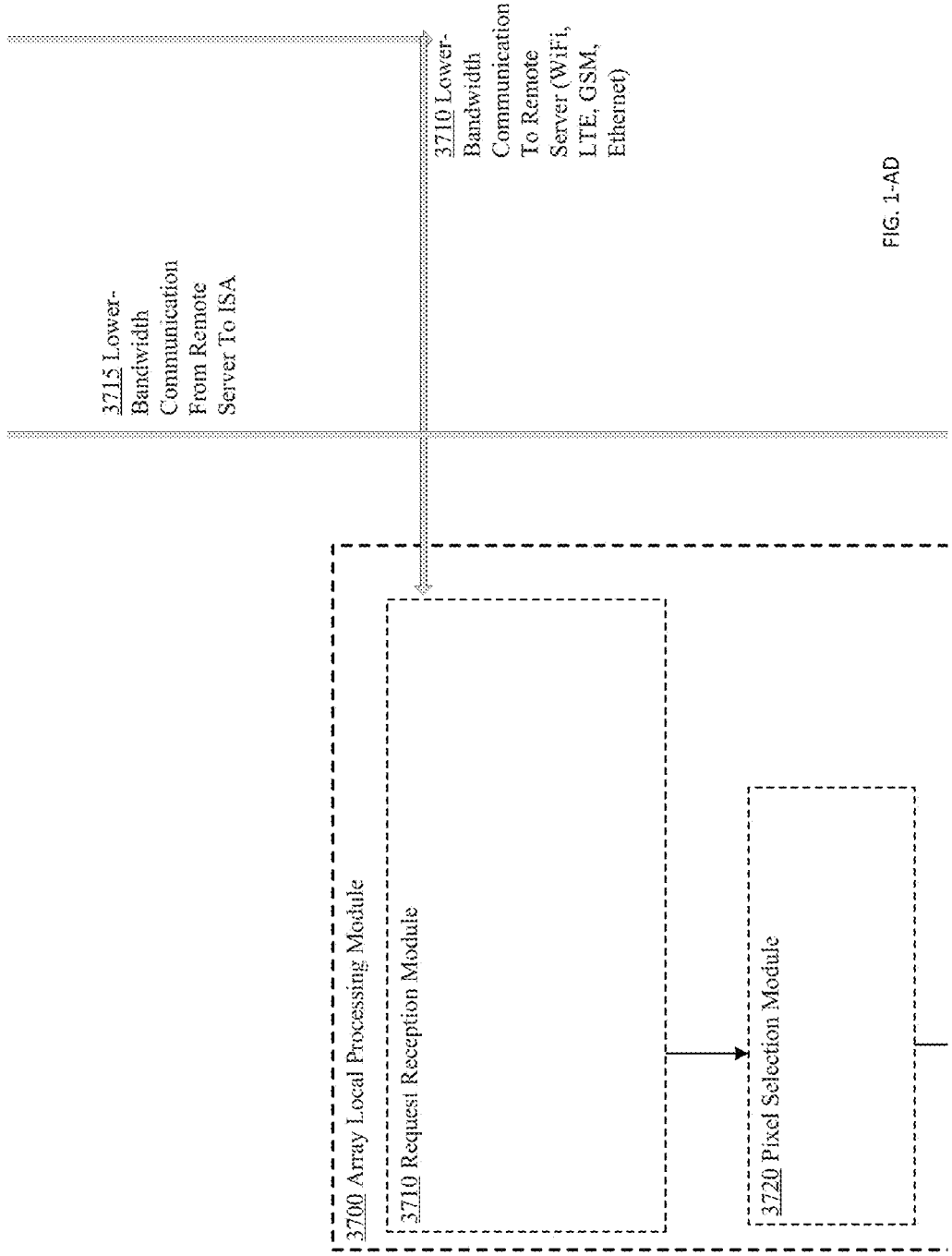
FIG. 1-AD

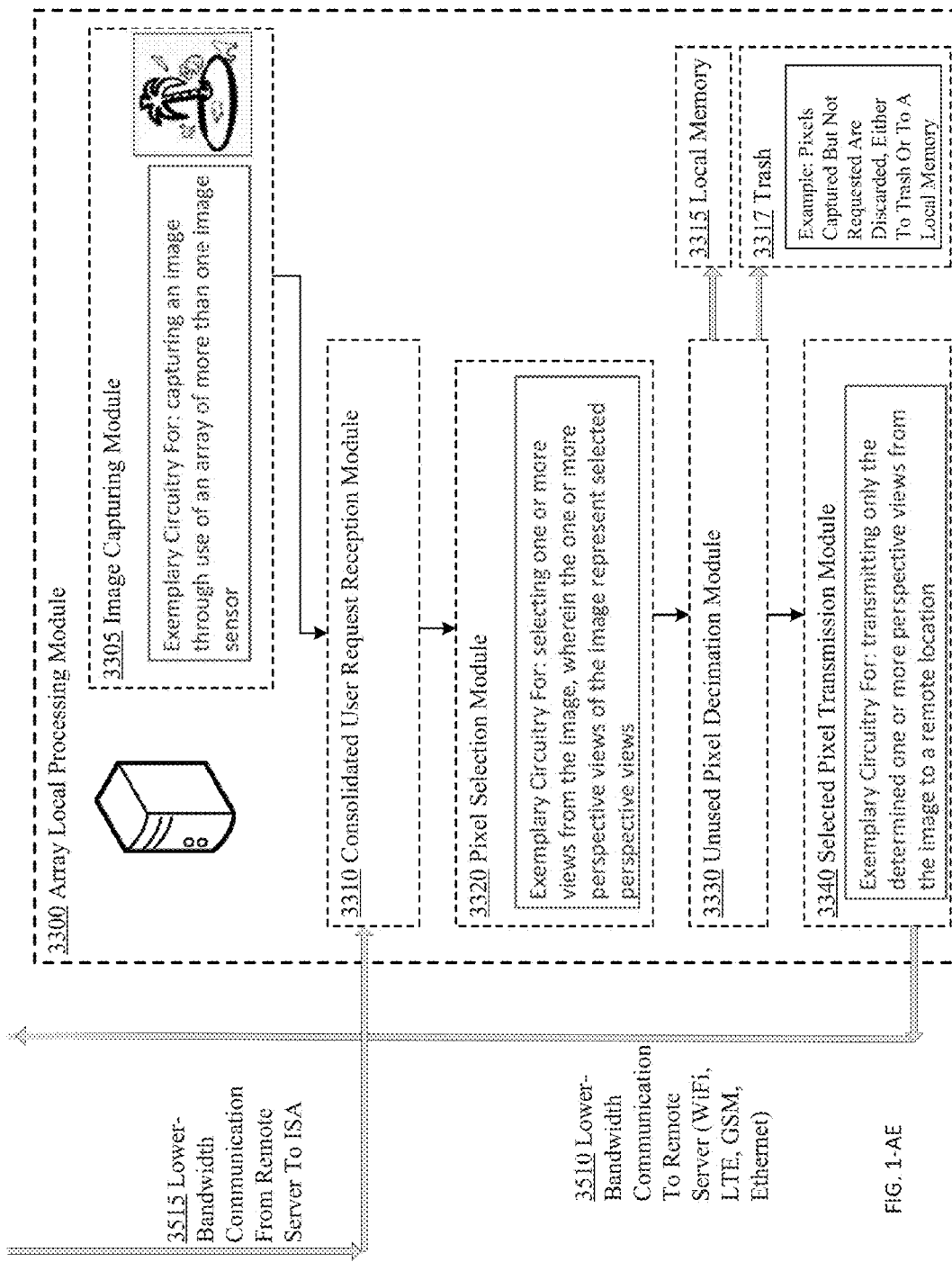
FIG. 1-AE

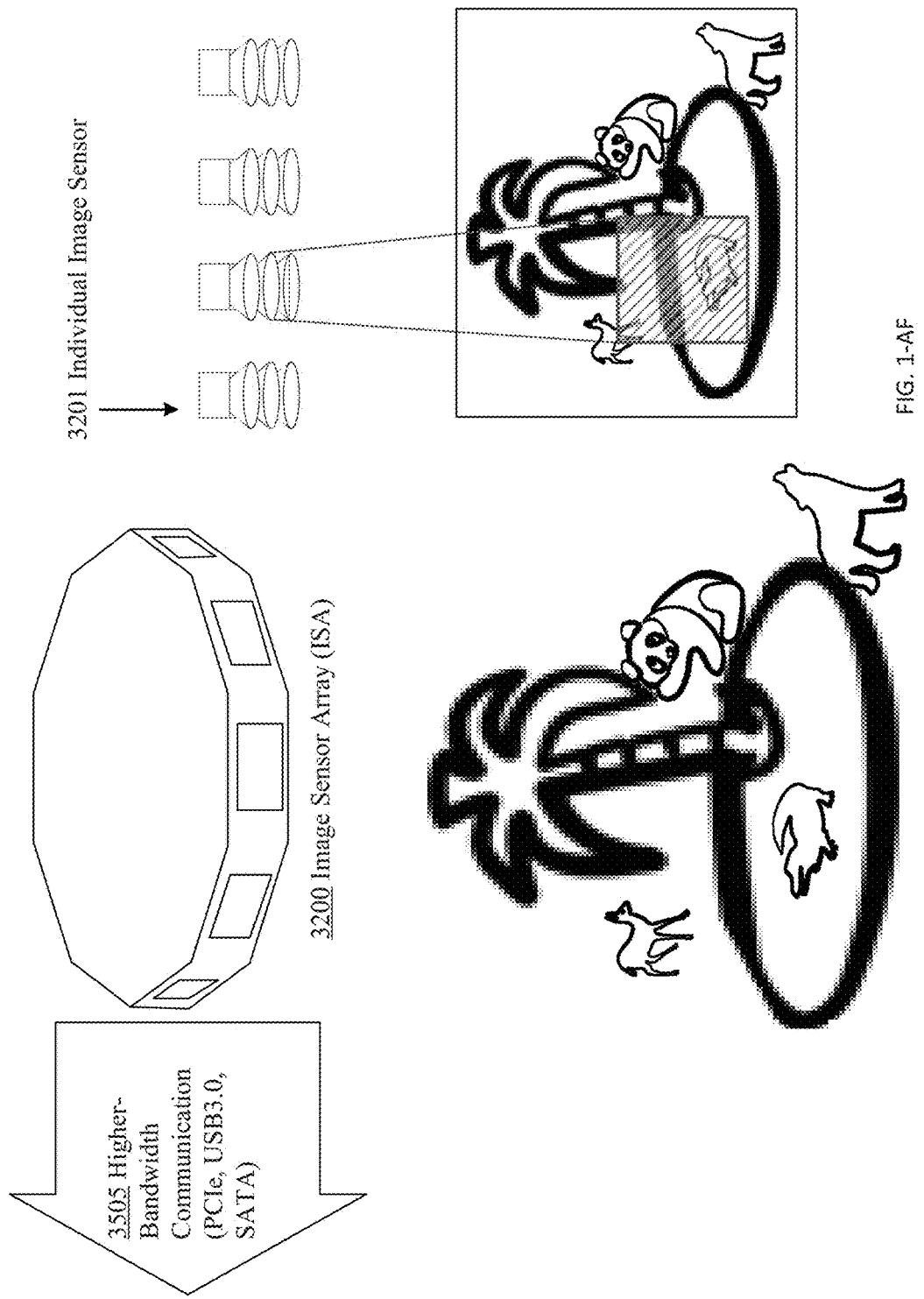

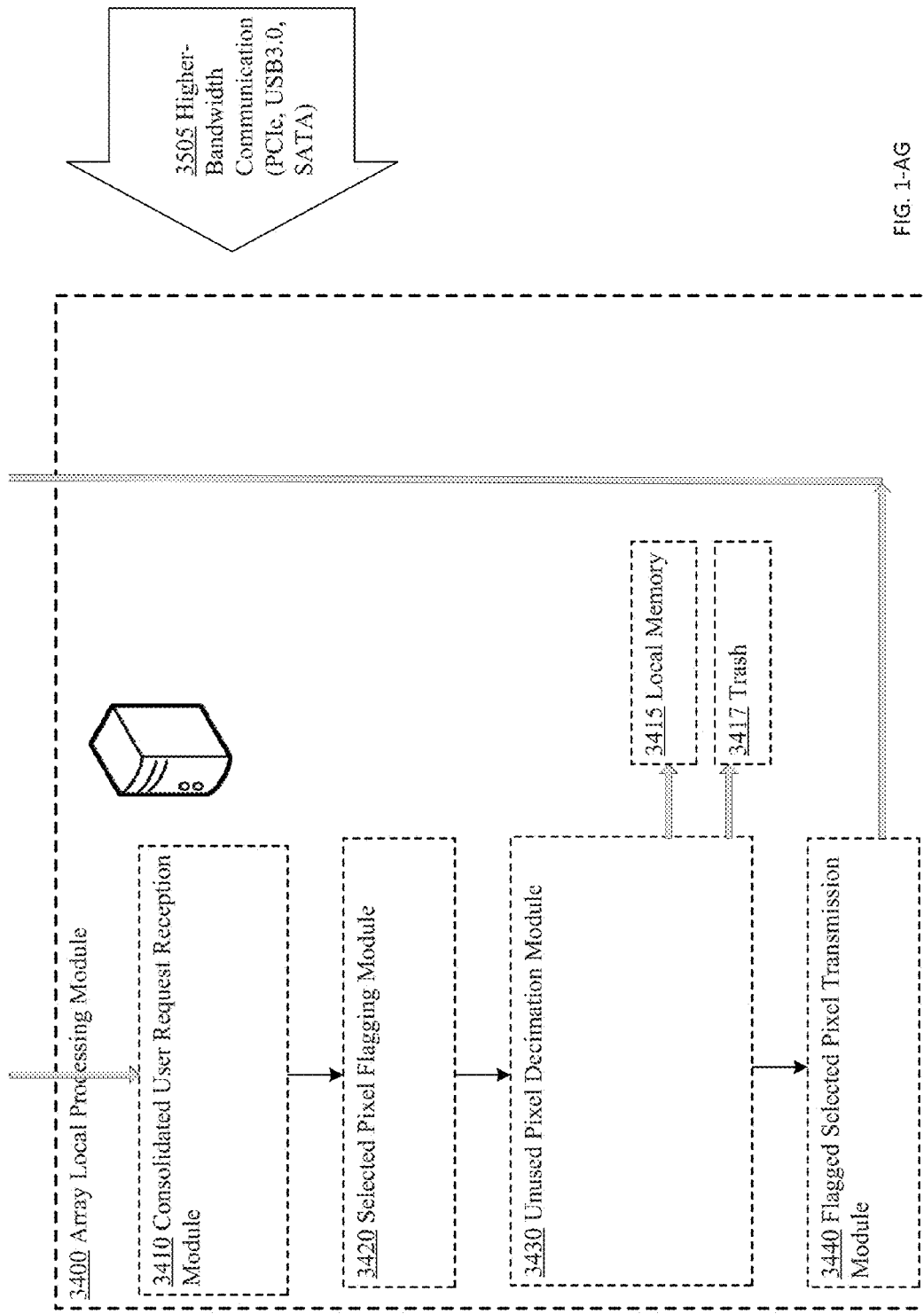
FIG. 1-AG

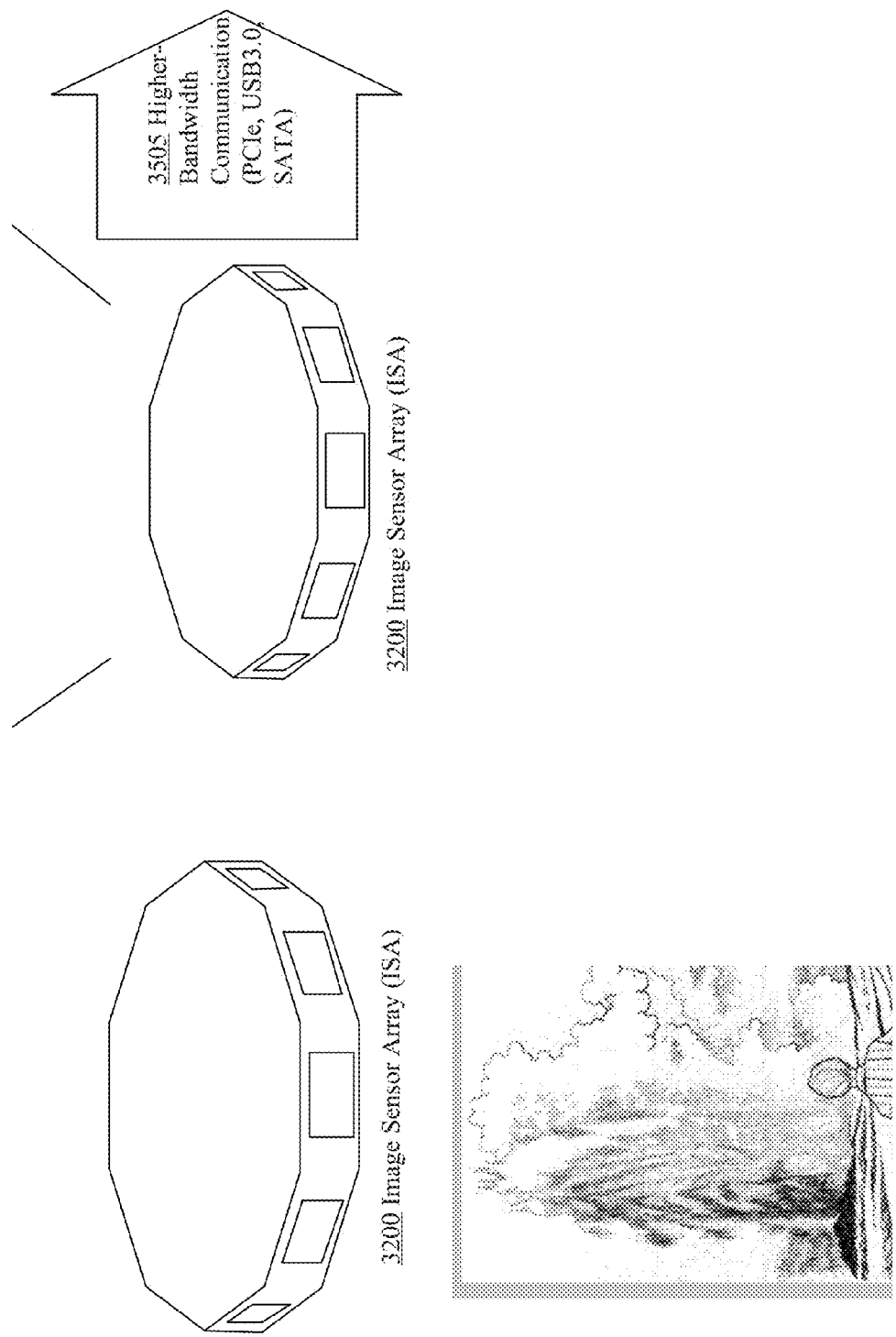

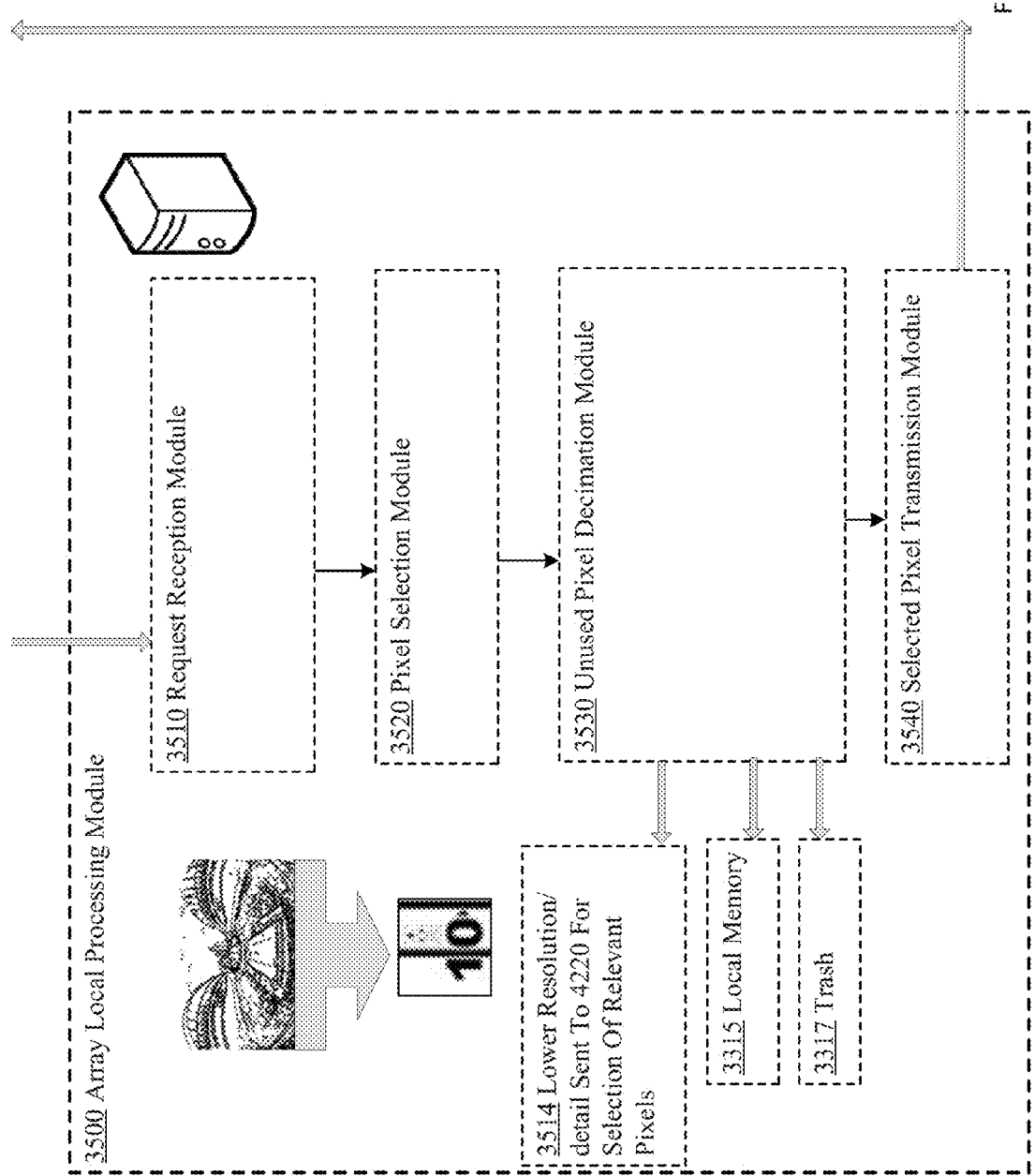
FIG. 1-AI

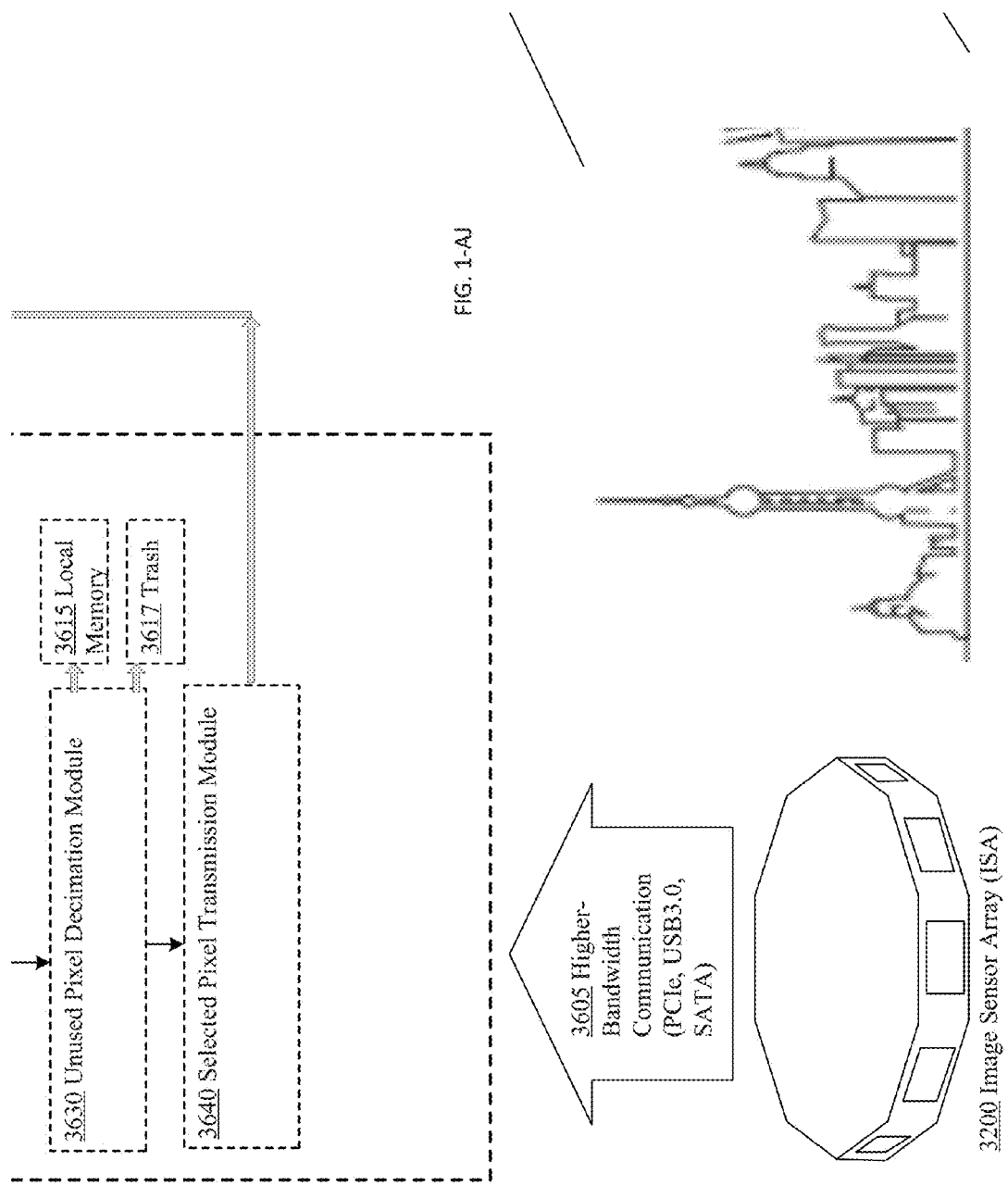

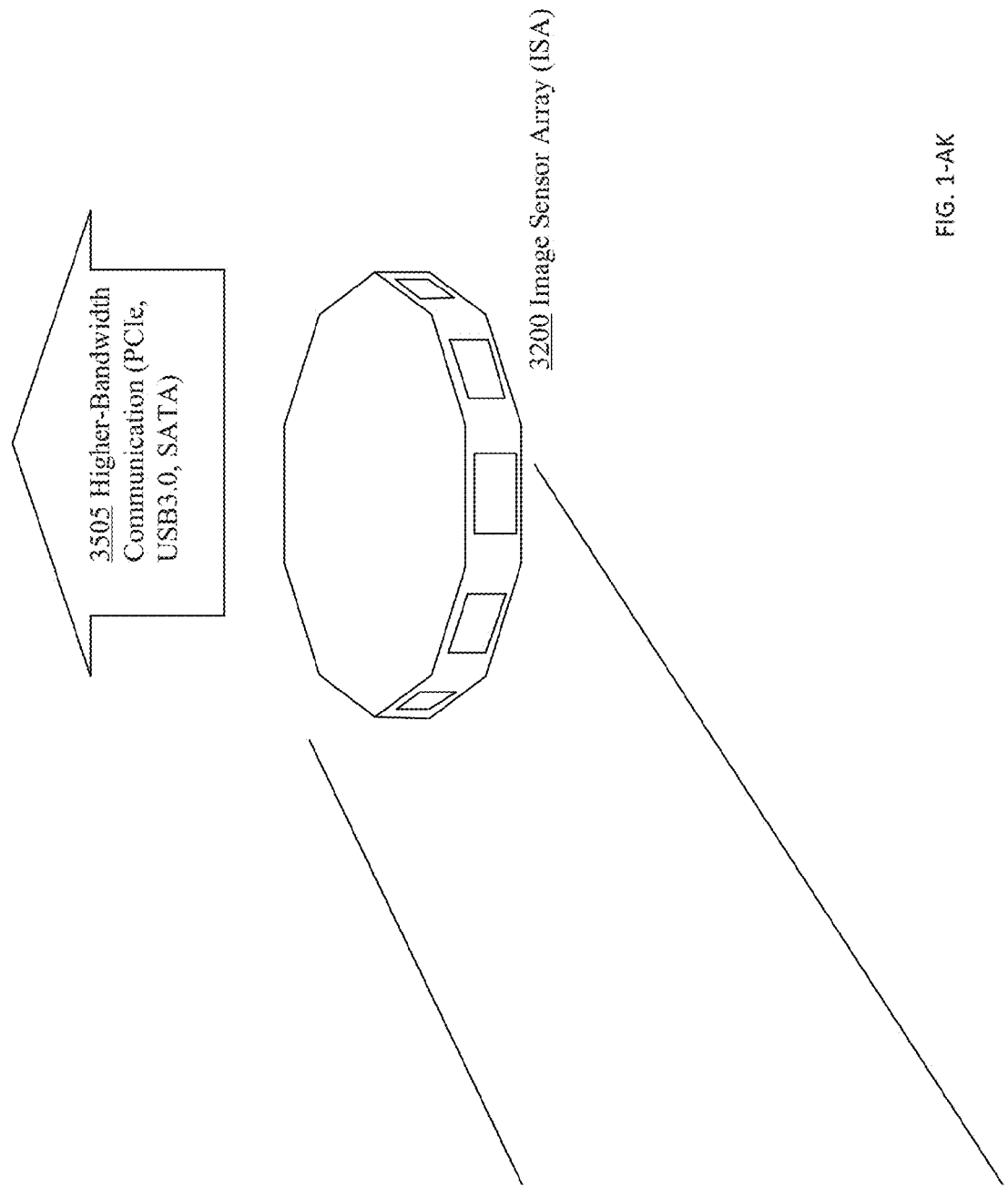
FIG. 1-AK

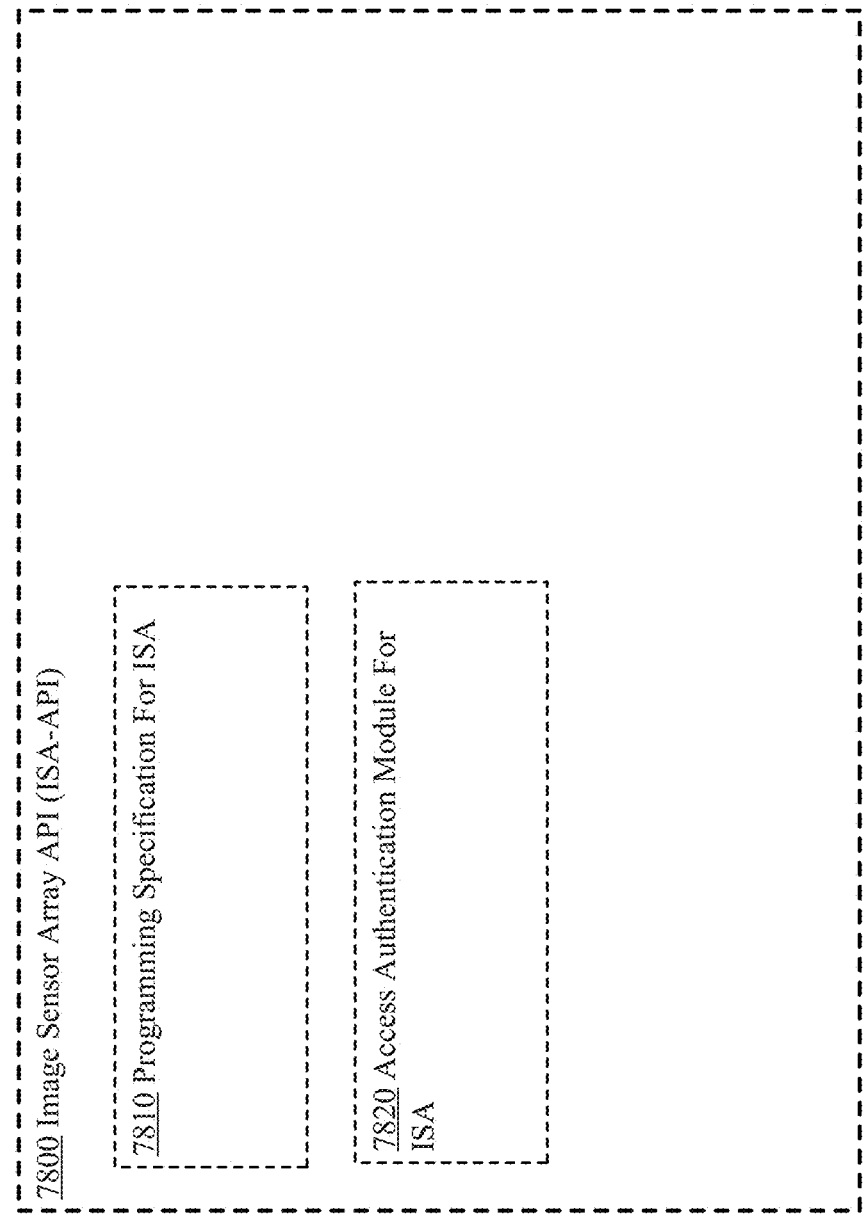
FIG. 1-AL

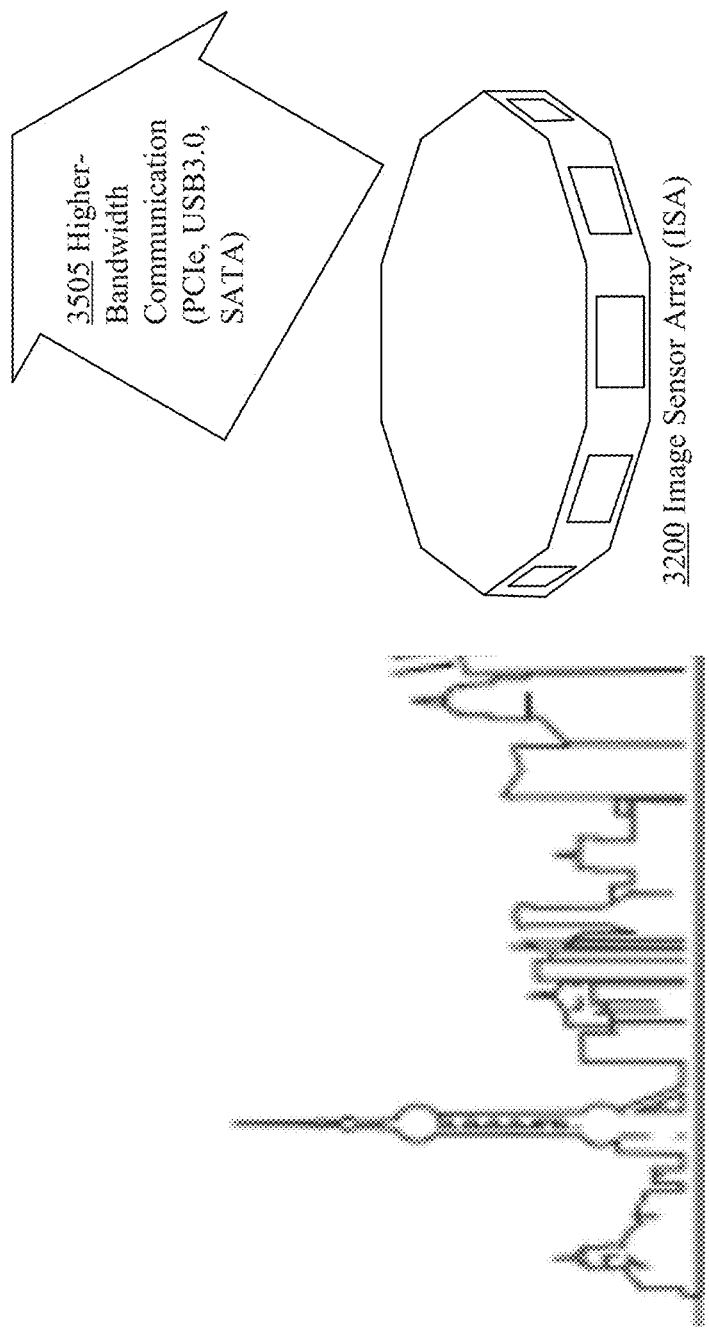
FIG. 1-AM

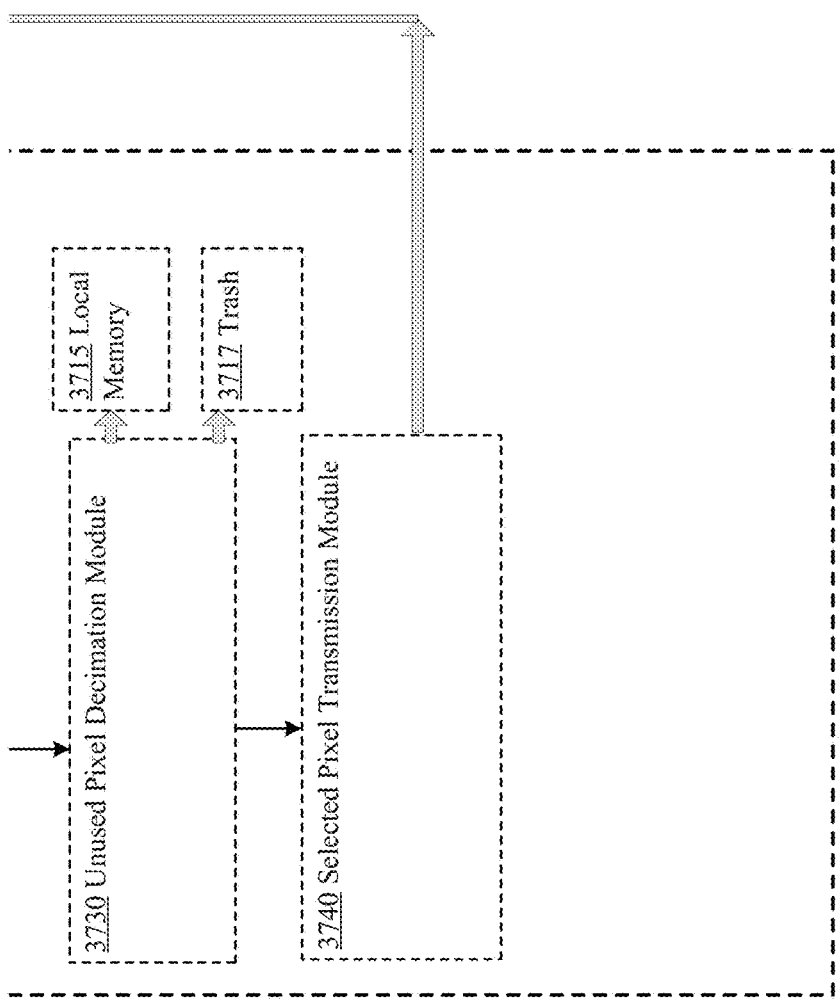
FIG. 1-AN

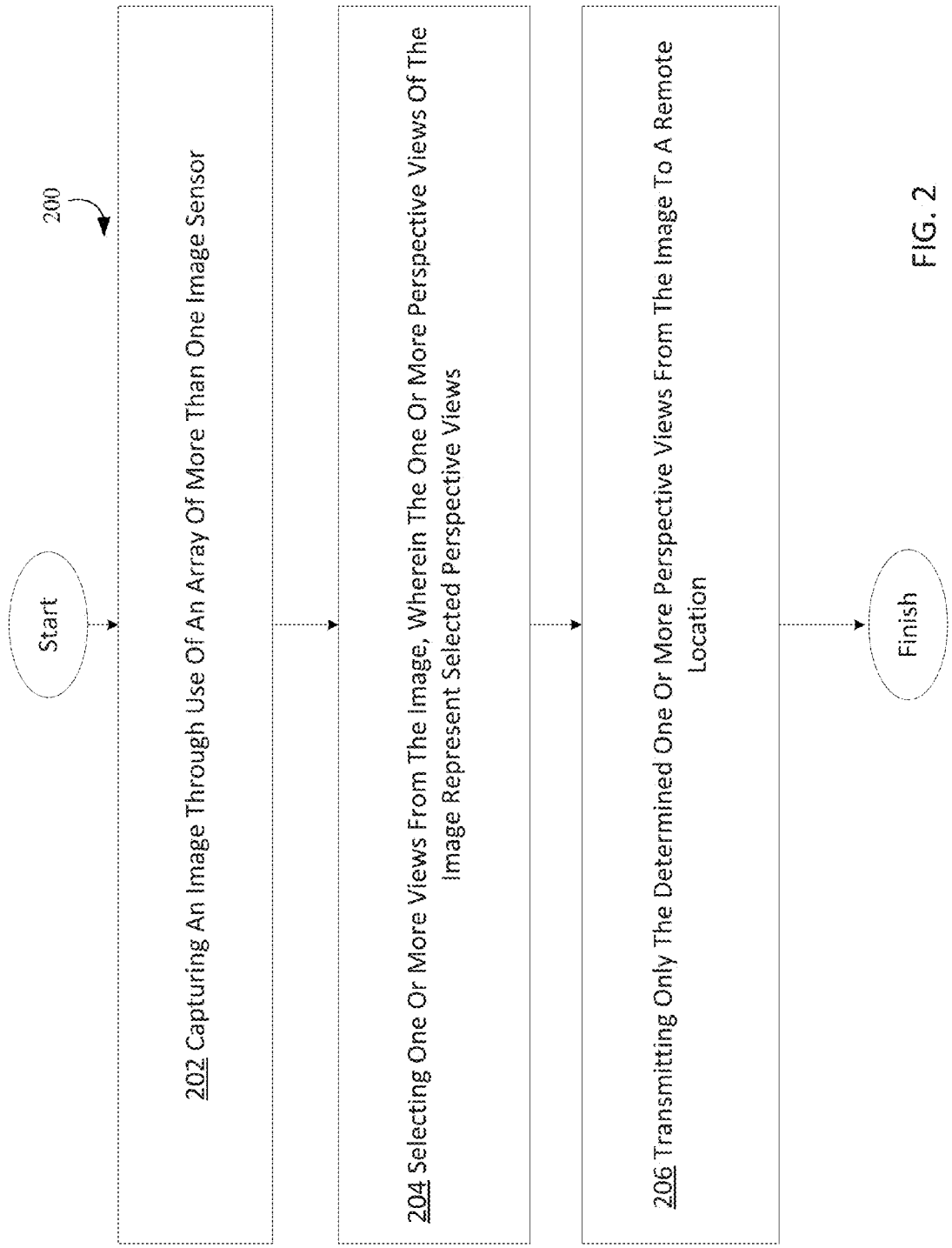

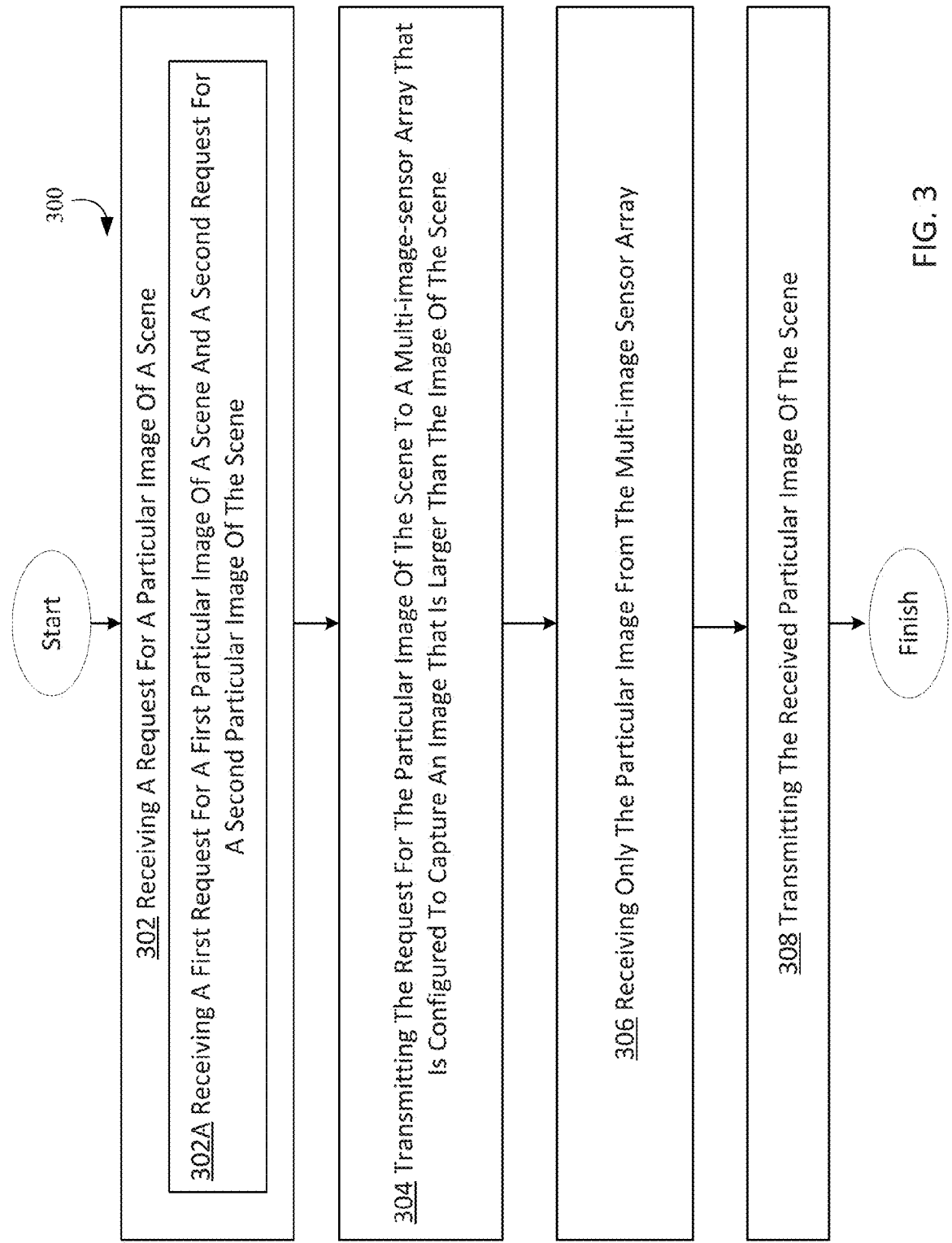

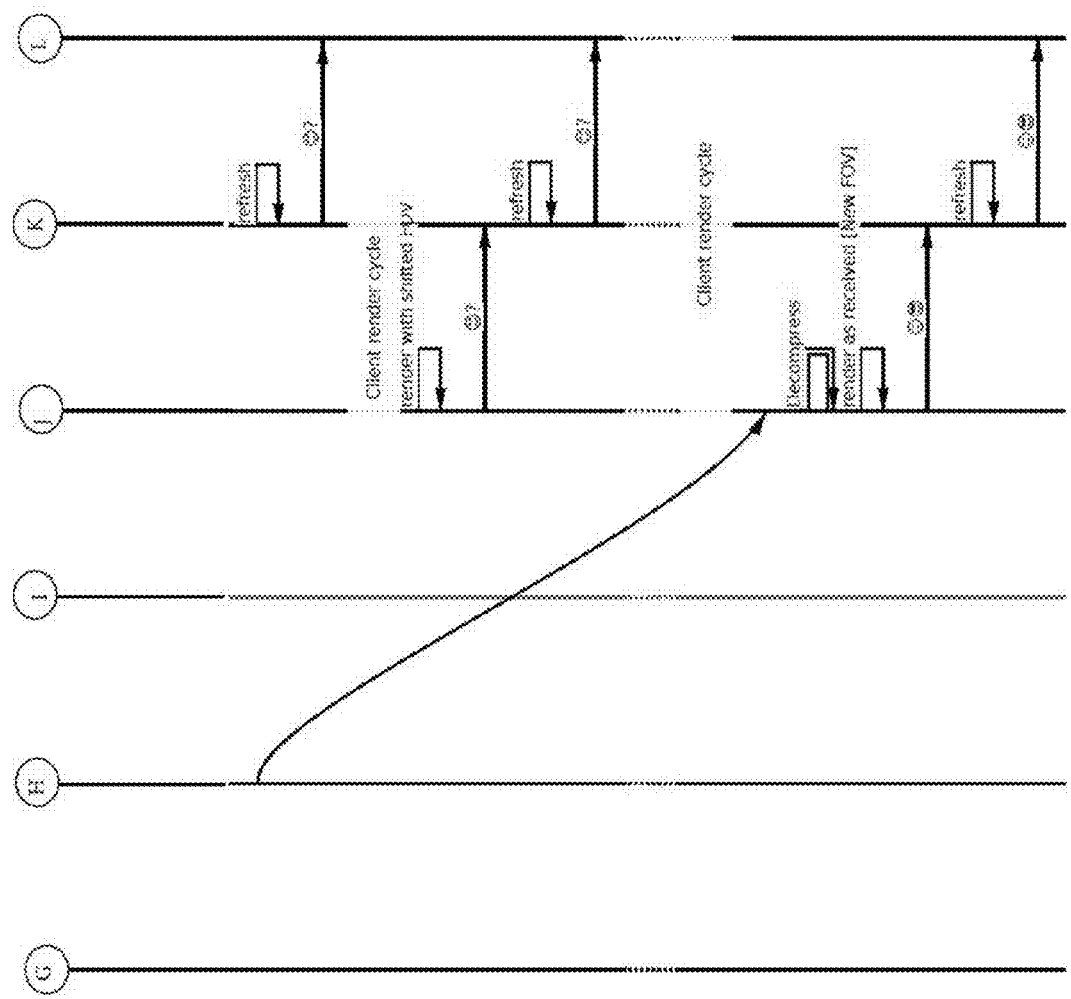

DEVICES, METHODS AND SYSTEMS FOR VISUAL IMAGING ARRAYS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 62/081,559 titled DEVICES, METHODS, AND SYSTEMS FOR INTEGRATING MULTIPLE USER VIDEO IMAGING ARRAY, naming Russell Hannigan as inventor, filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/081,560 titled DEVICES, METHODS, AND SYSTEMS FOR IMPLEMENTATION OF MULTIPLE USER VIDEO IMAGING ARRAY (MUVIA), naming Russell Hannigan, Roderick A. Hyde, Muriel Y. Ishikawa, 3ric Johanson, Jordin T. Kare, Tony S. Pan, Clarence T. Tegreene, Charles Whitmer, Lowell L. Wood, Jr., and Victoria Y. H. Wood, filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,001 titled DEVICES, METHODS, AND SYSTEMS FOR INTEGRATING MULTIPLE USER ACCESS CAMERA ARRAY, naming Russell Hannigan, Ehren Bray, and 3ric Johanson as inventors, filed 19 Nov. 2014 which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,002 titled DEVICES, METHODS, AND SYSTEMS FOR INTEGRATING MULTIPLE USER VIDEO IMAGING ARRAY, naming Russell Hannigan, Ehren Bray, and 3ric Johanson as inventors, filed 19 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/156,162 titled DEVICES, METHODS, AND SYSTEMS FOR INTEGRATING MULTIPLE USER VIDEO IMAGING ARRAY, naming Russell Hannigan, Ehren Bray, 3ric Johanson, and Phil Rustchman as inventors, filed 1 May 2015 which was filed within the twelve months preceding the filing date of the present application or is an application of which a currently co-pending application is entitled to the benefit of the filing date.

RELATED APPLICATIONS

None as of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to video imaging arrays that may be capable of handling multiple users.

SUMMARY

In one or more various aspects, a method includes but is not limited to that which is illustrated in the drawings. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1, including FIGS. 1A through 1AL, shows a high-level system diagram of one or more exemplary environments in which transactions and potential transactions may be carried out, according to one or more embodiments. FIG. 1 forms a partially schematic diagram of an environment(s) and/or an implementation(s) of technologies described herein when FIGS. 1A through 1AL are stitched together in the manner shown in FIG. 1Z, which is reproduced below in table format.

In accordance with 37 C.F.R. § 1.84(h)(2), FIG. 1 shows "a view of a large machine or device in its entirety . . . broken into partial views . . . extended over several sheets" labeled FIG. 1A through FIG. 1AD (Sheets 1-30). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1A through 1AD are ordered alphabetically, by increasing in columns from left to right, and increasing in rows top to bottom, as shown in the following table:

TABLE 1

Figure 4:
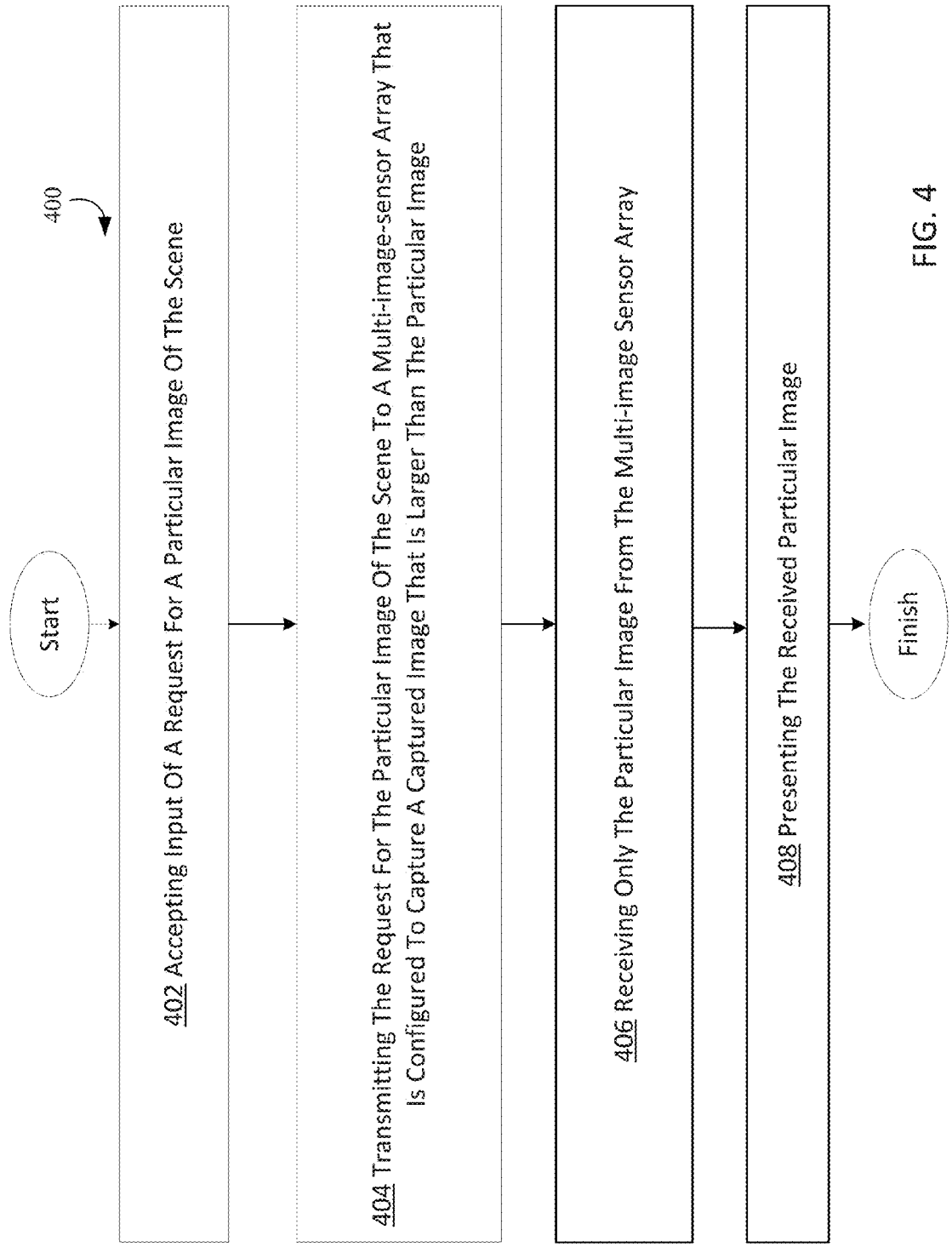

Table showing alignment of enclosed drawings to form partial schematic of one or more environments.

| Pos. (0, 0) | X-Pos 1 | X-Pos 2 | X-Pos 3 | X-Pos 4 | X-Pos 5 | X-Pos 6 | X-Pos 7 | X-Pos 8 | X-Pos 9 | X-Pos 10 |
|---|---|---|---|---|---|---|---|---|---|---|
| Y-Pos. 1 | (1, 1): FIG. 1-A | (1, 2): FIG. 1-B | (1, 3): FIG. 1-C | (1, 4): FIG. 1-D | (1, 5): FIG. 1-E | (1, 6): FIG. 1-F | (1, 7): FIG. 1-G | (1, 8): FIG. 1-H | (1, 9): FIG. 1-I | (1, 10): FIG. 1-J |
| Y-Pos. 2 | (2, 1): FIG. 1-K | (2, 2): FIG. 1-L | (2, 3): FIG. 1-M | (2, 4): FIG. 1-N | (2, 5): FIG. 1-O | (2, 6): FIG. 1-P | (2, 7): FIG. 1-Q | (2, 8): FIG. 1-R | (2, 9): FIG. 1-S | (2, 10): FIG. 1-T |
| Y-Pos. 3 | (3, 1): FIG. 1-U | (3, 2): FIG. 1-V | (3, 3): FIG. 1-W | (3, 4): FIG. 1-X | (3, 5): FIG. 1-Y | (3, 6): FIG. 1-Z | (3, 7): FIG. 1-AA | (3, 8): FIG. 1-AB | (3, 9): FIG. 1-AC | (3, 10): FIG. 1-AD |
| Y-Pos. 4 | (4, 1): FIG. 1-AE | (4, 2): FIG. 1-AF | (4, 3): FIG. 1-AG | (4, 3): FIG. 1-AH | (4, 5): FIG. 1-AI | (4, 6): FIG. 1-AJ | (4, 7): FIG. 1-AK | (4, 8): FIG. 1-AL | (4, 8): FIG. 1-AM | (4, 10): FIG. 1-AN |

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (1,6), forms at least a portion of a partially schematic diagram of an environment(s) and/or an implementation(s) of technologies described herein.

FIG. 1-G, when placed at position (1,7), forms at least a portion of a partially schematic diagram of an environment(s) and/or an implementation(s) of technologies described herein.

FIG. 1-H, when placed at position (1,8), forms at least a portion of a partially schematic diagram of an environment(s) and/or an implementation(s) of technologies described herein.

FIG. 1-I, when placed at position (1,9), forms at least a portion of a partially schematic diagram of an environment(s) and/or an implementation(s) of technologies described herein.

FIG. 1-J, when placed at position (1,10), forms at least a portion of a partially schematic diagram of an environment(s) and/or an implementation(s) of technologies described herein.

FIG. 1-K, when placed at position (2,1), forms at least a portion of a partially schematic diagram of an environment(s) and/or an implementation(s) of technologies described herein.

FIG. 1-L, when placed at position (2,2), forms at least a portion of a partially schematic diagram of an environment(s) and/or an implementation(s) of technologies described herein.

FIG. 1-M, when placed at position (2,3), forms at least a portion of a partially schematic diagram of an environment(s) and/or an implementation(s) of technologies described herein.

FIG. 1-N, when placed at position (2,4), forms at least a portion of a partially schematic diagram of an environment(s) and/or an implementation(s) of technologies described herein.

FIG. 1-O (which format is changed to avoid confusion as Figure "10" or "ten"), when placed at position (2,5), forms at least a portion of a partially schematic diagram of an environment(s) and/or an implementation(s) of technologies described herein.

FIG. 1-P, when placed at position (2,6), forms at least a portion of a partially schematic diagram of an environment(s) and/or an implementation(s) of technologies described herein.

FIG. 1-Q, when placed at position (2,7), forms at least a portion of a partially schematic diagram of an environment(s) and/or an implementation(s) of technologies described herein.

FIG. 1-R, when placed at position (2,8), forms at least a portion of a partially schematic diagram of an environment(s) and/or an implementation(s) of technologies described herein.

FIG. 1-S, when placed at position (2,9), forms at least a portion of a partially schematic diagram of an environment(s) and/or an implementation(s) of technologies described herein.

FIG. 1-T, when placed at position (2,10), forms at least a portion of a partially schematic diagram of an environment(s) and/or an implementation(s) of technologies described herein.

FIG. 1-U, when placed at position (3,1), forms at least a portion of a partially schematic diagram of an environment(s) and/or an implementation(s) of technologies described herein.

FIG. 1-V, when placed at position (3,2), forms at least a portion of a partially schematic diagram of an environment(s) and/or an implementation(s) of technologies described herein.

FIG. 1-W, when placed at position (3,3), forms at least a portion of a partially schematic diagram of an environment(s) and/or an implementation(s) of technologies described herein.

FIG. 1-X, when placed at position (3,4), forms at least a portion of a partially schematic diagram of an environment(s) and/or an implementation(s) of technologies described herein.

FIG. 1-Y, when placed at position (3,5), forms at least a portion of a partially schematic diagram of an environment(s) and/or an implementation(s) of technologies described herein.

FIG. 1-Z, when placed at position (3,6), forms at least a portion of a partially schematic diagram of an environment(s) and/or an implementation(s) of technologies described herein.

FIG. 1-AA, when placed at position (3,7), forms at least a portion of a partially schematic diagram of an environment(s) and/or an implementation(s) of technologies described herein.

FIG. 1-AB, when placed at position (3,8), forms at least a portion of a partially schematic diagram of an environment(s) and/or an implementation(s) of technologies described herein.

FIG. 1-AC, when placed at position (3,9), forms at least a portion of a partially schematic diagram of an environment(s) and/or an implementation(s) of technologies described herein.

FIG. 1-AD, when placed at position (3,10), forms at least a portion of a partially schematic diagram of an environment(s) and/or an implementation(s) of technologies described herein.

FIG. 1-AE, when placed at position (4,1), forms at least a portion of a partially schematic diagram of an environment(s) and/or an implementation(s) of technologies described herein.

FIG. 1-AF, when placed at position (4,2), forms at least a portion of a partially schematic diagram of an environment(s) and/or an implementation(s) of technologies described herein.

FIG. 1-AG, when placed at position (4,3), forms at least a portion of a partially schematic diagram of an environment(s) and/or an implementation(s) of technologies described herein.

FIG. 1-AH, when placed at position (4,4), forms at least a portion of a partially schematic diagram of an environment(s) and/or an implementation(s) of technologies described herein.

FIG. 1-AI, when placed at position (4,5), forms at least a portion of a partially schematic diagram of an environment(s) and/or an implementation(s) of technologies described herein.

FIG. 1-AJ, when placed at position (4,6), forms at least a portion of a partially schematic diagram of an environment(s) and/or an implementation(s) of technologies described herein.

FIG. 1-AK, when placed at position (4,7), forms at least a portion of a partially schematic diagram of an environment(s) and/or an implementation(s) of technologies described herein.

FIG. 1-AL, when placed at position (4,8), forms at least a portion of a partially schematic diagram of an environment(s) and/or an implementation(s) of technologies described herein.

FIG. 1-AM, when placed at position (4,9), forms at least a portion of a partially schematic diagram of an environment(s) and/or an implementation(s) of technologies described herein.

FIG. 1-AN, when placed at position (4,10), forms at least a portion of a partially schematic diagram of an environment(s) and/or an implementation(s) of technologies described herein.

FIG. 2 shows an exemplary operation 200, according to embodiments of the invention.

FIG. 3 shows an exemplary operation 300, according to embodiments of the invention.

FIG. 4 shows an exemplary operation 400, according to embodiments of the invention.

Figure 5:
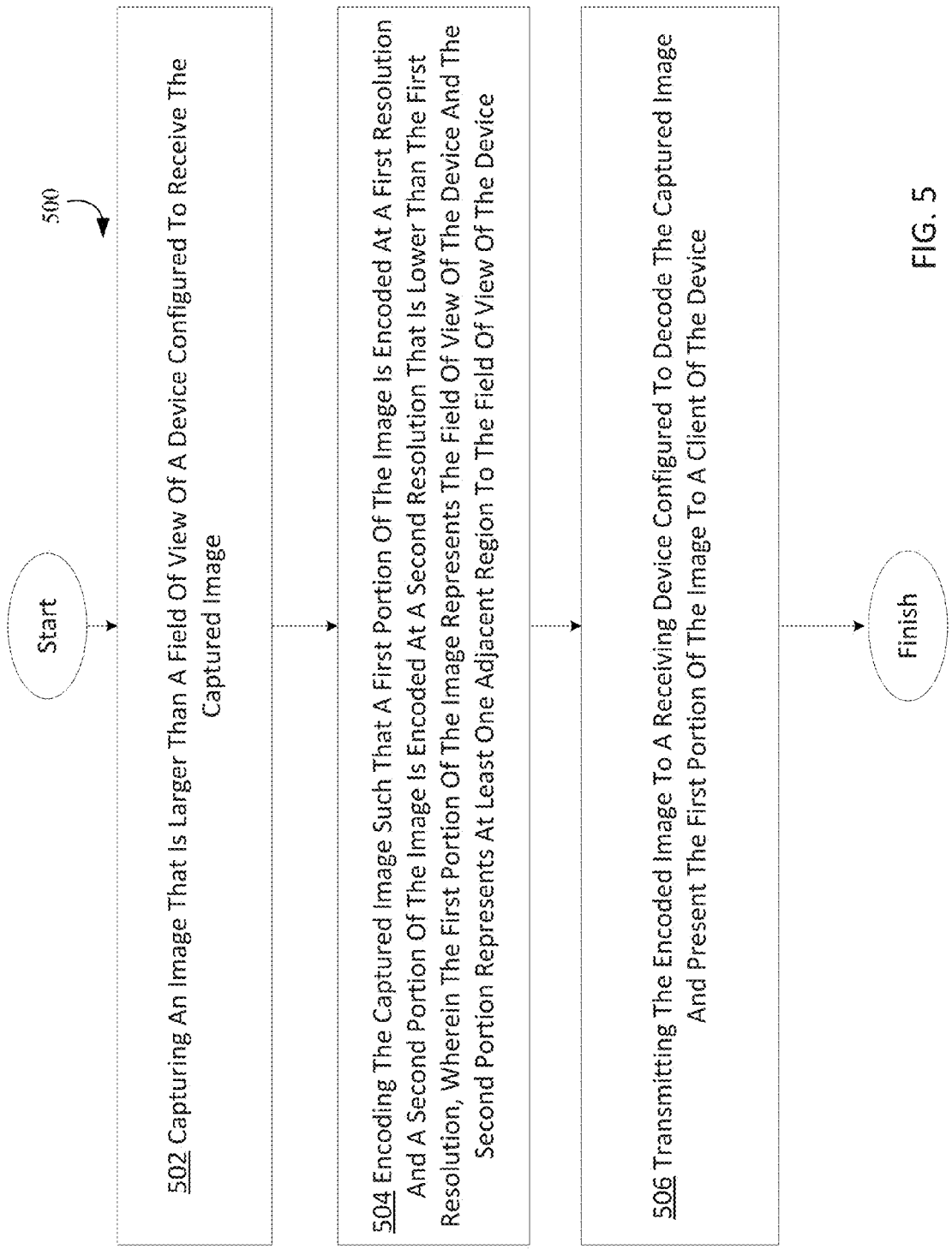

FIG. 5 shows an exemplary operation 500, according to embodiments of the invention.

Figure 6A:
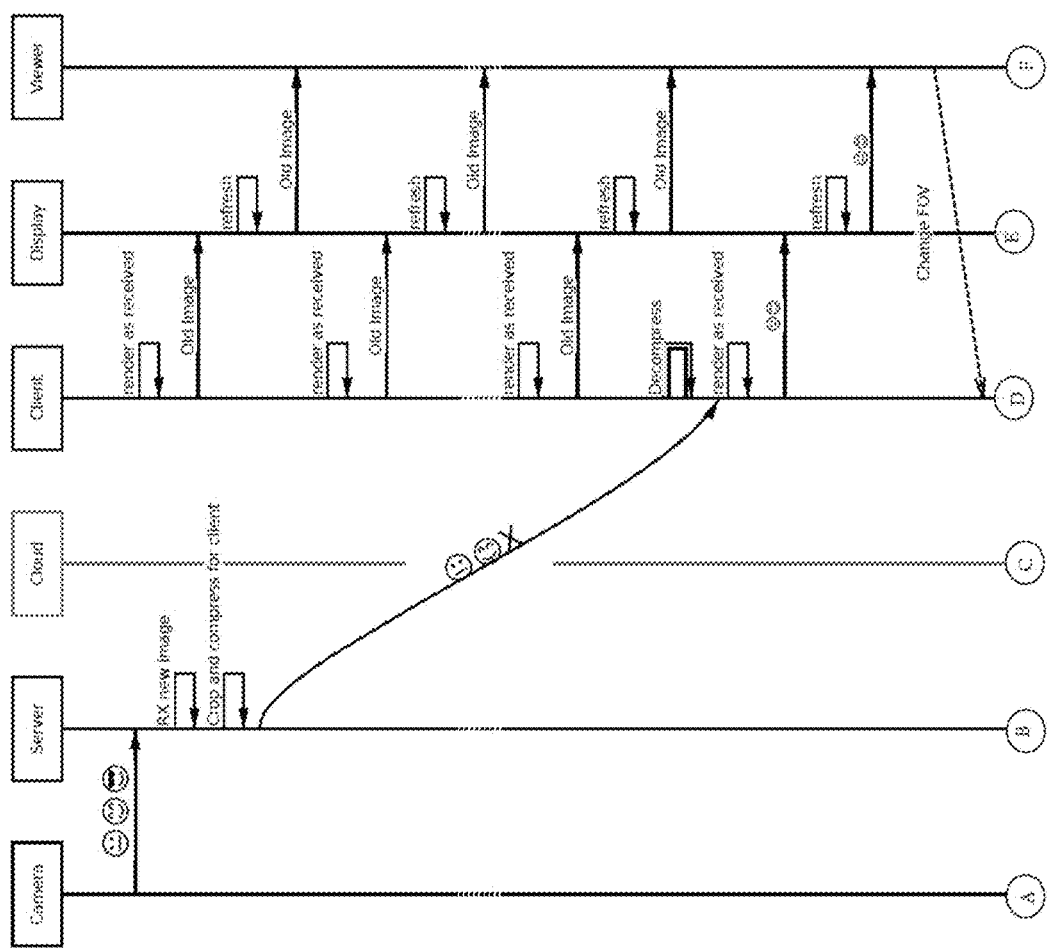

FIG. 6A shows a first part of a latency hiding message sequence diagram, according to an embodiment of the invention.

Figure 6B:
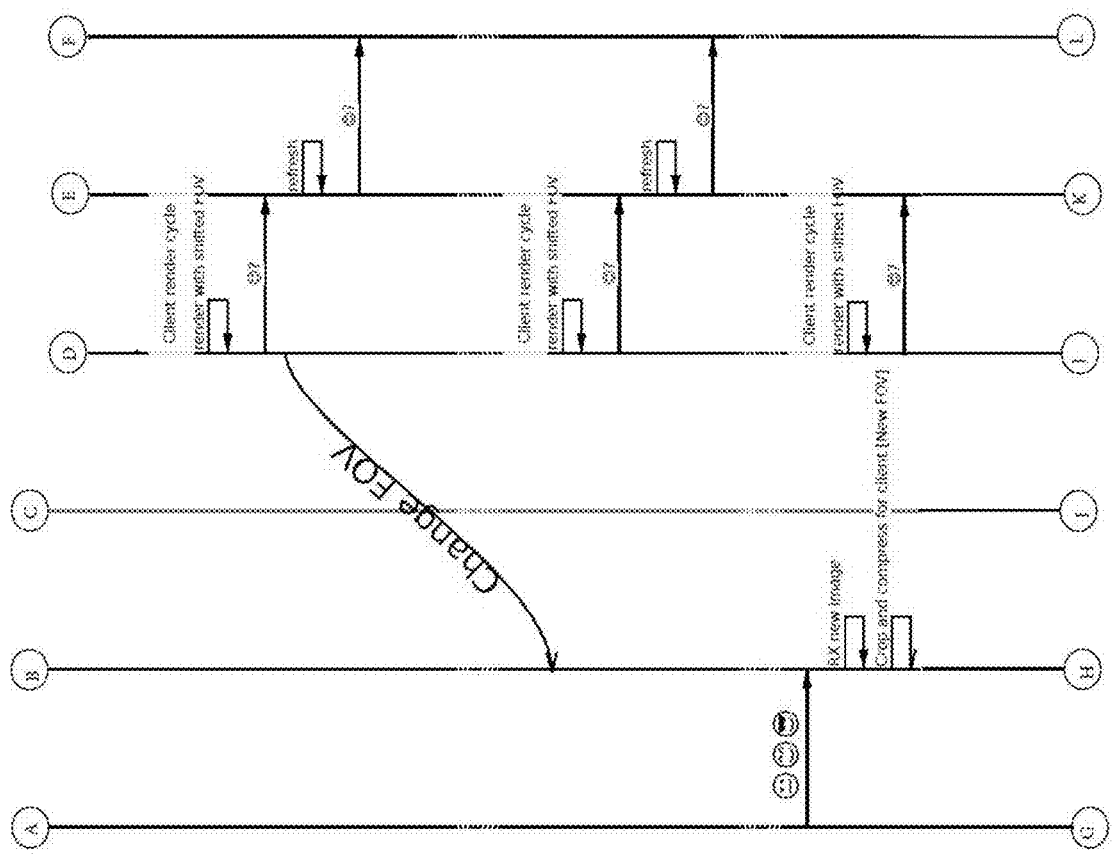

FIG. 6B shows a first part of a latency hiding message sequence diagram, according to an embodiment of the invention.

FIG. 6C shows a first part of a latency hiding message sequence diagram, according to an embodiment of the invention.

DETAILED DESCRIPTION

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011100001111001111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

Referring now to FIG. 1, FIG. 1 shows various implementations of the overall system. At a high level, FIG. 1 shows various implementations of a multiple user video imaging array (hereinafter interchangeably referred to as a "MUVIA"). It is noted that the designation "MUVIA" is merely shorthand and descriptive of an exemplary embodiment, and not a limiting term. Although "multiple user" appears in the name MUVIA, multiple users or even a single user are not required. Further, "video" is used in the designation "MUVIA," but MUVIA systems also may capture still images, multiple images, audio data, electromagnetic waves outside the visible spectrum, and other data as will be described herein. Further, "imaging array" may be used in the MUVIA designation, but the image sensor in MUVIA is not necessarily an array or even multiple sensors (although commonly implemented as larger groups of image sensors, single-sensor implementations are also contemplated), and "array" here does not necessarily imply any specific structure, but rather any grouping of one or more sensors.

Generally, although not necessarily required, a MUVIA system may include one or more of a user device (e.g., hereinafter interchangeably referred to as a "client device," in recognition that a user may not necessarily be a human, living, or organic"), a server, and an image sensor array. A "server" in the context of this application may refer to any device, program, or module that is not directly connected to the image sensor array or to the client device, including any and all "cloud" storage, applications, and/or processing.

For example, in an embodiment, e.g., as shown in FIG. 1-A, FIG. 1-K, FIG. 1-U, FIG. 1-AE, and FIG. 1-AF, in an embodiment, the system may include one or more of image sensor array 3200, array local storage and processing module 3300, server 4000, and user device 5200. Each of these portions will be discussed in more detail herein.

Referring now to FIG. 1-A, FIG. 1-A depicts user device 5200, which is a device that may be operated or controlled by a user of a MUVIA system. It is noted here that "user" is merely provided as a designation for ease of understanding, and does not imply control by a human or other organism, sentient or otherwise. In an embodiment, for example, in a security-type embodiment, the user device 5200 may be mostly or completely unmonitored, or may be monitored by an artificial intelligence, or by a combination of artificial intelligence, pseudo-artificial intelligence (e.g., that is intelligence amplification) and human intelligence.

User device 5200 may be, but is not limited to, a wearable device (e.g., glasses, goggles, headgear, a watch, clothing), an implant (e.g., a retinal-implant display), a computer of any kind (e.g., a laptop computer, desktop computer, mainframe, server, etc.), a tablet or other portable device, a phone or other similar device (e.g., smartphone, personal digital assistant), a personal electronic device (e.g., music player, CD player), a home appliance (e.g., a television, a refrigerator, or any other so-called "smart" device), a piece of office equipment (e.g., a copier, scanner, fax device, etc.), a camera or other camera-like device, a video game system, an entertainment/media center, or any other electrical equipment that has a functionality of presenting an image (whether visual or by other means, e.g., a screen, but also other sensory stimulating work).

User device 5200 may be capable of presenting an image, which, for purposes of clarity and conciseness will be referred to as displaying an image, although communication through forms other than generating light waves through the visible light spectrum, although the image is not required to be presented at all times or even at all. For example, in an embodiment, user device 5200 may receive images from server 4000 (or directly from the image sensor array 3200, as will be discussed herein), and may store the images for later viewing, or for processing internally, or for any other reason.

Referring again to FIG. 1-A, in an embodiment, user device 5200 may include a user selection accepting module 5210. User selection accepting module 5210 may be configured to receive user input about what the user wants to see. For example, as shown in FIG. 1-A in the exemplary interface 5212, the user selection accepting module 5210 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the user selection accepting module may accept a selection of a particular thing—e.g., a building, an animal, or any other object whose representation is present on the screen. Moreover, a user may use a text box to "search" the image for a particular thing, and processing, done at the user device 5200 or at the server 4000, may determine the image and the zoom level for viewing that thing. The search for a particular thing may include a generic search, e.g., "search for people," or "search for penguins," or a more specific search, e.g., "search for the Space Needle," or "search for the White House." The search for a particular thing may take on any known contextual search, e.g., an address, a text string, or any other input.

In an embodiment, the "user selection" facilitated by the user selection accepting module 5210 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-A, in an embodiment, user device 5200 may include a user selection transmitting module 5220. The user selection transmitting module 5220 may take the user selection from user selection transmitting module 5220, and transmit the selection to the server 4000. The transmission may include some pre-processing, for example, the user device 5200 may determine the size and parameters of the image prior to sending the request to the server 4000, or that processing may be handled by the server 4000. Following the thick-line arrow leftward from user selection transmitting module 5220 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-A, FIG. 1-A also includes a selected image receiving module 5230 and a user selection presenting module 5240, which will be discussed in more detail herein, with respect to the dataflow of this embodiment.

Referring now to FIG. 1-K, FIGS. 1-K and 1-U show an embodiment of a server 4000 that communicates with one or both of user device 5200 and array local storage and processing module 3300. Sever 4000 may be a single computing device, or may be many computing devices, which may or may not be in proximity with each other.

Referring again to FIG. 1-K, server 4000 may include a user request reception module 4010. The user request reception module 4010 may receive the transmitted request from user selection transmitting module 5220. The user request reception module 4010 may then turn over processing to user request validation module 4020, which may perform, among other things, a check to make sure the user is not requesting more resolution than what their device can handle. For example, if the server has learned (e.g., through gathered information, or through information that was transmitted with the user request or in a same session as the user request), that the user is requesting a 1900×1080 resolution image, and the maximum resolution for the device is 1334× 750, then the request will be modified so that no more than the maximum resolution that can be handled by the device is requested. In an embodiment, this may conserve the bandwidth required to transmit from the MUVIA to the server 4000 and/or the user device 3200

Referring again to FIG. 1-K, in an embodiment, server 4000 may include a user request latency management module 4030. User request latency management module 4030 may, in conjunction with user device 3200, attempt to reduce the latency from the time a specific image is requested by user device 3200 to the time the request is acted upon and data is transmitted to the user. The details for this latency management will be described in more detail herein, with varying techniques that may be carried out by any or all of the devices in the chain (e.g., user device, camera array, and server). As an example, in an embodiment, a lower resolution version of the image, e.g., that is stored locally or on the server, may be sent to the user immediately upon the request, and then that image is updated with the actual image taken by the camera. In an embodiment, user request latency management module 4030 also may handle static gap-filling, that is, if the image captured by the camera is unchanging, e.g., has not changed for a particular period of time, then a new image is not necessary to be captured, and an older image, that may be stored on server 4000, may be transmitted to the user device 3200. This process also will be discussed in more detail herein.

Referring now to FIG. 1-U, which shows more of server 4000, in an embodiment, server 4000 may include a consolidated user request transmission module 4040, which may be configured to consolidate all the user requests, perform any necessary pre-processing on those requests, and send the request for particular sets of pixels to the array local storage and processing module 3300. The process for consolidating the user requests and performing pre-processing will be described in more detail herein with respect to some of the other exemplary embodiments. In this embodiment, however, server consolidated user request transmission module 4040 transmits the request (exiting leftward from FIG. 1-U and traveling downward to FIG. 1-AE, through a pathway identified in FIG. 1-AE as lower-bandwidth communication from remote server 3515. It is noted here that "lower bandwidth communication" does not necessarily mean "low bandwidth" or imply any specific number about the bandwidth—it is simply lower than the relatively higher bandwidth communication from the actual image sensor array 3505 to the array local storage and processing module 3300, which will be discussed in more detail herein.

Referring again to FIG. 1-U, server 4000 also may include requested pixel reception module 4050, user request preparation module 4060, and user request transmission module 4070, which will be discussed in more detail herein, with respect to the dataflow of this embodiment Referring now to FIGS. 1-AE and 1-AF, FIGS. 1-AE and 1-AF show an image sensor array ("ISA") 3200 and an array local storage and processing module 3300, each of which will now be described in more detail.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3300. In an embodiment, array local storage and processing module 3300 is integrated into the image sensor array. In another embodiment, the array local storage and processing module 3300 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3300 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3200 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3300 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3300 may send only the requested pixels, but the requested pixels cover more area than what the user originally requested. These additional pixels may be transmitted and "cached" by the server or local device, which may be used to decrease latency times, in a process that will be discussed more herein.

Referring now to FIG. 2, one process that may be carried out by array local processing module 3300 includes process 200. Process 200 may include step 202 of capturing an image through use of an array of more than one image sensor, step 204 of selecting one or more views from the image, wherein the one or more views from the image represent selected views, and step 206 of transmitting only the determined one or more views from the image to a remote location. These steps may be carried out by server 4000.

Referring back to FIG. 1-U, the transmitted pixels transmitted from selected pixel transmission module 3340 of array local processing module 3300 may be received by server 4000, e.g., at requested pixel reception module 4050. Requested pixel reception module 4050 may receive the requested pixels and turn them over to user request preparation module 4060, which may "unpack" the requested pixels, e.g., determining which pixels go to which user, and at what resolutions, along with any post-processing, including image adjustment, adding in missing cached data, or adding additional data to the images (e.g., advertisements or other data). In an embodiment, server 4000 also may include a user request transmission module 4070, which may be configured to transmit the requested pixels back to the user device 5200.

Referring again to FIG. 1-A, user device 5200 may include a selected image receiving module 5230, which may receive the pixels that were sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-A.

FIGS. 1-B, 1-C, 1-M, 1-W, 1-AG, and 1-AH show another embodiment of the MUVIA system, in which multiple user devices 5510, 5520, and 5530 may request images captured by the same image sensor array 3200.

Referring now to FIGS. 1-B and 1-C, user device 5510, user device 5520, and user device 5530 are shown. In an embodiment, user devices 5510, 5520, and 5530 may have some or all of the same components as user device 5200, but are not shown here for clarity and ease of understanding the drawing. For each of user devices 5510, 5520, and 5530, exemplary screen resolutions have been chosen. There is nothing specific about these numbers that have been chosen, however, they are merely illustrated for exemplary purposes, and any other numbers could have been chosen in their place.

For example, in an embodiment, referring to FIG. 1-B, user device 5510 may have a screen resolution of 1920× 1080 (e.g., colloquially referred to as "HD quality"). User device 5510 may send an image request to the server 4000, and may also send data regarding the screen resolution of the device.

Referring now to FIG. 1-C, user device 5520 may have a screen resolution of 1334×750. User device 5520 may send another image request to the server 4000, and, in an embodiment, instead of sending data regarding the screen resolution of the device, may send data that identifies what kind of device it is (e.g., an Apple-branded smartphone). Server 4000 may use this data to determine the screen resolution for user device 5520 through an internal database, or through contacting an external source, e.g., a manufacturer of the device or a third party supplier of data about devices.

Referring again to FIG. 1-C, user device 5530 may have a screen resolution of 640×480, and may send the request by itself to the server 4000, without any additional data. In addition, server 4000 may receive independent requests from various users to change their current viewing area on the device.

Referring now to FIG. 1-M, server 4000 may include user request reception module 4110. User request reception module 4110 may receive requests from multiple user devices, e.g., user devices 5510, 5520, and 5530. Server 4000 also may include an independent user view change request reception module 4115, which, in an embodiment, may be a part of user request reception module 4110, and may be configured to receive requests from users that are already connected to the system, to change the view of what they are currently seeing.

Referring again to FIG. 1-M, server 4000 may include relevant pixel selection module 4120 configured to combine the user selections into a single area, as shown in FIG. 1-M. It is noted that, in an embodiment, the different user devices may request areas that overlap each other. In this case, there may be one or more overlapping areas, e.g., overlapping areas 4122. In an embodiment, the overlapping areas are only transmitted once, in order to save data/transmission costs and increase efficiency.

Referring now to FIG. 1-W, server 4000 may include selected pixel transmission to ISA module 4130. Module 4130 may take the relevant selected pixels, and transmit them to the array local processing module 3400 of image sensor array 3200. Selected pixel transmission to ISA module 4130 may include communication components, which may be shared with other transmission and/or reception modules.

Referring now to FIG. 1-AG, array local processing module 3400 may communicate with image sensor array 3200. Similarly to FIGS. 1-AE and 1-AF, FIGS. 1-AG and 1-AH show array local processing module 3400 and image sensor array 3200, respectively.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3400. In an embodiment, array local storage and processing module 3400 is integrated into the image sensor array. In another embodiment, the array local storage and processing module 3400 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3400 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AG, the image sensor array 3200 may capture an image that is received by image capturing module 3405. Image capturing module 3405 may take the captured image and compare it to a consolidated user request, e.g., which is provided by a consolidated user request reception module 3410. Consolidated user request reception module 3410 may receive the communication from server 4000 regarding which pixels of the image have been requested. Through use of the consolidated user request and the captured image, pixel selection module 3420 may select the pixels that have been specifically requested by the user, and mark those pixels for transmission back to the server.

After the pixels to be kept are identified, the other pixels that are not to be kept are removed, e.g., decimated at unused pixel decimation module 3430. In an embodiment, these pixels are simply discarded, e.g., not stored in a long-term memory, that is removed to a digital trash 3417. In another embodiment, some or all of these pixels are stored in a local memory, e.g., local memory 3415. From here, these pixels may be transmitted to various locations at off-peak times, may be kept for image processing by the array local processing module 3400, or may be subject to other manipulations or processing separate from the user requests.

Referring gain to FIG. 1-AG, array local processing module 3400 may include flagged selected pixel transmission module 3440, which takes the pixels identified as requested (e.g., "flagged") and transmits them back to the server 4000 for further processing. Similarly to as previously described, this transmission may utilize a lower-bandwidth channel, and module 3440 may include all necessary hardware to effect that lower-bandwidth transmission to server 4000.

Referring again to FIG. 1-W, the flagged selected pixel transmission module 3440 of array local processing module 3400 may transmit the flagged pixels to server 4000. Specifically, flagged selected pixel transmission module 3440 may transmit the pixels to flagged selected pixel reception from ISA module 4140 of server 4000, as shown in FIG. 1-W.

Referring again to FIG. 1-W, server 4000 also may include flagged selected pixel separation and duplication module 4150, which may, effectively, reverse the process of combining the pixels from the various selections, duplicating overlapping areas where necessary, and creating the requested images for each of the user devices that requested images. Flagged selected pixel separation and duplication module 4150 also may include the post-processing done to the image, including filling in cached versions of images, image adjustments based on the device preferences and/or the user preferences, and any other image post-processing.

Referring now to FIG. 1-M (as data flows "northward" from FIG. 1-W from module 4150), server 4000 may include pixel transmission to user device module 4160, which may be configured to transmit the pixels that have been separated out and processed to the specific users that requested the image. Pixel transmission to user device module 4160 may handle the transmission of images to the user devices 5510, 5520, and 5530. In an embodiment, pixel transmission to user device module 4160 may have some or all components in common with user request reception module 4110.

Following the arrow of data flow to the right and upward from module 4160 of server 4160, the requested user images arrive at user device 5510, user device 5520, and user device 5530, as shown in FIGS. 1-B and 1-C. The user devices 5510, 5520, and 5530 may present the received images as previously discussed and/or as further discussed herein.

Referring now to FIG. 3, server 4000 may execute one or more operations 300. In an embodiment, operations 300 may include one or more of a step 302 depicting receiving a request for a particular image of a scene (e.g., in an embodiment, step 302 may include step 302A for receiving a first request for a first particular image of a scene and a second request for a second particular image of the scene), a step 304 depicting transmitting the request for the particular image of the scene to a multi-image sensor array that is configured to capture an image that is larger than the image of the scene, a step 306 depicting receiving only the particular image from the multi-image sensor array, and a step 308 transmitting the received particular image of the scene.

Referring again to FIG. 1, FIGS. 1-E, 1-O, 1-Y, 1-AH, and 1-AI depict a MUVIA implementation according to an embodiment. In an embodiment, referring now to FIG. 1-E, a user device 5600 may include a target selection reception module 5610. Target selection reception module 5610 may be a component that allows the user to select a "target" from the image, that is, a point of interest from the image. For example, in the shown example, the MUVIA array is pointed at a football stadium, e.g., CenturyLink Field. As an example, a user may select one of the football players visible on the field as a "target." This may be facilitated by a target presentation module, e.g., target presentation module 5612, which may present one or more images (e.g., which may be various versions of images from MUVIA, at different resolutions or not up-to-date) from which the user may select the target, e.g., the football player.

In an embodiment, target selection reception module 5610 may include an audible target selection module 5614 which may be configured to allow the user to select a target using audible commands, without requiring physical interaction with a device.

Referring again to FIG. 1, e.g., FIG. 1-E, in an embodiment, user device 5600 may include selected target transmission module 5620. Selected target transmission module 5620 may be configured to take the target selected by the user, and transmit the selected target to the server 4000.

Referring now to FIG. 1-O, FIG. 1-O (and FIG. 1-Y to the direct "south" of FIG. 1-O) shows an embodiment of server 4000. For example, in an embodiment, server 4000 may include a selected target reception module 4210. In an embodiment, selected target reception module 4210 of server 4000 may receive the selected target from the user device 5600. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-O, in an embodiment, server 4000 may include selected target identification module 4220, which may be configured to take the target data received by selected target reception module 4210 and determine an image that needs to be captured in order to obtain an image that contains the selected target (e.g., in the shown example, the football player). In an embodiment, selected target identification module 4220 may use images previously received (or, in an embodiment, current images) from the image sensor array 3200 to determine the parameters of an image that contains the selected target. For example, in an embodiment, lower-resolution images from the image sensor array 3200 may be transmitted to server 4000 for determining where the target is located within the image, and then specific requests for portions of the image may be transmitted to the image sensor array 3200, as will be discussed herein.

In an embodiment, server 4000 may perform processing on the selected target data, and/or on image data that is received, in order to create a request that is to be transmitted to the image sensor array. For example, in the given example, the selected target data is a football player. The server 4000, that is, selected target identification module 4220 may perform image recognition on one or more images captured from the image sensor array to determine a "sector" of the entire scene that contains the selected target. In another embodiment, the selected target identification module 4220 may use other, external sources of data to determine where the target is. In yet another embodiment, the selected target data was selected by the user from the scene displayed by the image sensor array, so such processing may not be necessary.

Referring again to FIG. 1-O, in an embodiment, server 4000 may include pixel information selection module 4230, which may select the pixels needed to capture the target, and which may determine the size of the image that should be transmitted from the image sensor array. The size of the image may be determined based on a type of target that is selected, one or more parameters (set by the user, by the device, or by the server, which may or may not be based on the selected target), by the screen resolution of the device, or by any other algorithm. Pixel information selection module 4230 may determine the pixels to be captured in order to express the target, and may update based on changes in the target's status (e.g., if the target is moving, e.g., in the football example, once a play has started and the football player is moving in a certain direction).

Referring now to FIG. 1-Y, FIG. 1Y includes more of server 4000 according to an embodiment. In an embodiment, server 4000 may include pixel information transmission to ISA module 4240. Pixel information transmission to ISA module 4240 may transmit the selected pixels to the array local processing module 3500 associated with image sensor array 3500.

Referring now to FIGS. 1-AH and 1-AI, FIG. 1-AH depicts an image sensor array 3200, which in this example is pointed at a football stadium, e.g., CenturyLink field. Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3500. In an embodiment, array local storage and processing module 3500 is integrated into the image sensor array. In another embodiment, the array local storage and processing module 3500 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3500 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3200 may capture an image that is received by image capturing module 3505. Image capturing module 3505 may take the captured image and compare it to a consolidated user request, e.g., which is provided by a consolidated user request reception module 3510. Consolidated user request reception module 3510 may receive the communication from server 4000 regarding which pixels of the image have been requested. Through use of the consolidated user request and the captured image, pixel selection module 3520 may select the pixels that have been specifically requested by the user, and mark those pixels for transmission back to the server.

After the pixels to be kept are identified, the other pixels that are not to be kept are removed, e.g., decimated at unused pixel decimation module 3530. In an embodiment, these pixels are simply discarded, e.g., not stored in a long-term memory, that is removed to a digital trash 3517. In another embodiment, some or all of these pixels are stored in a local memory, e.g., local memory 3515. From here, these pixels may be transmitted to various locations at off-peak times, may be kept for image processing by the array local processing module 3500, or may be subject to other manipulations or processing separate from the user requests. In an embodiment, unused pixel decimation module may include or communicate with a lower resolution module 3514, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AE, the selected pixels then may be transmitted to the server 4000 using selected pixel transmission module 3540. Selected pixel transmission module 3540 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

Referring now again to FIG. 1-Y, server 4000 may include a requested image reception from ISA module 4250. Requested image reception from ISA module 4250 may receive the image data from the array local processing module 3500 (e.g., in the arrow coming "north" from FIG. 1-AI. That image, as depicted in FIG. 1-Y, may include the target (e.g., the football player), as well as some surrounding area (e.g., the area of the field around the football player). The "surrounding area" and the specifics of what is included/transmitted from the array local processing module may be specified by the user (directly or indirectly, e.g., through a set of preferences), or may be determined by the server, e.g., in the pixel information selection module 4230.

Referring again to FIG. 1-Y, server 4000 may also include a requested image transmission to user device module 4260. Requested image transmission to user device module 4260 may transmit the requested image to the user device 5600. Requested image transmission to user device module 4260 may include components necessary to communicate with user device 5600 and may, in some embodiments, share components with one or more other modules of server 4000, e.g., a network interface, or a wireless antenna.

Referring again to FIG. 1-Y, server 4000 may include a server cached image updating module 4270. Server cached image updating module 4270 may take the images received from the array local processing module 3500 (e.g., which may include the image to be sent to the user), and compare the received images with stored or "cached" images on the server, in order to determine if the cached images should be updated. This process may happen frequently or infrequently, depending on embodiments, and may be continuously ongoing as long as there is a data connection, in some embodiments. In some embodiments, the frequency of the process may depend on the available bandwidth to the array local processing module 3500, e.g., that is, at off-peak times, the frequency may be increased. In an embodiment, server cached image updating module 4270 compares an image received from the array local processing module 3500, and, if the image has changes, replaces the cached version of the image with the newer image.

Referring now again to FIG. 1-E, FIG. 1-E shows user device 5600. In an embodiment, user device 5600 includes image containing selected target receiving module 5630 that may be configured to receive the image from server 4000, e.g., requested image transmission to user device module 4260 of server 4000 (e.g., depicted in FIG. 1-Y, with the data transmission indicated by a rightward-upward arrow passing through FIG. 1-Y and FIG. 1-O (to the north) before arriving at FIG. 1-E.

Referring again to FIG. 1-E, FIG. 1-E shows received image presentation module 5640, which may display the requested pixels that include the selected target to the user, e.g., by showing them on a screen of the device. In an embodiment, the display of the image may be carried out through an exemplary interface that allows the user to monitor the target, and which also may display information about the target (e.g., in an embodiment, as shown in the figures, the game statistics for the football player also may be shown), which allows a cycle of user requests and new images to be shown as the user navigates through what is seen on the MUVIA, e.g., as shown in FIG. 1-A.

Referring again to FIG. 1, FIGS. 1-F, 1-P, 1-Z, and 1-AJ depict a MUVIA implementation according to an embodiment. This embodiment may be colloquially known as "live street view" in which one or more MUVIA systems allow for a user to move through an area similarly to the well known Google-branded Maps (or Google-Street), except with the cameras working in real time. For example, in an embodiment, referring now to FIG. 1-F, a user device 5600 may include a target selection reception module 5710. Target selection reception module 5710 may be a component that allows the user to select a "target" from the image, that is, a point of interest from the image. For example, in the shown example, the MUVIA may be focused on a city, and the target may be an address, a building, a car, or a person in the city. As an example, a user may select a street address as a "target." This may be facilitated by a target presentation module, e.g., image selection presentation module 5712, which may present one or more images (e.g., which may be various versions of images from MUVIA, at different resolutions or not up-to-date) from which the user may select the target, e.g., the street address. In an embodiment, image selection presentation module 5712 may use static images that may or may not be sourced by the MUVIA system, and, in another embodiment, image selection presentation module 5712 may use current or cached views from the MUVIA system.

In an embodiment, image selection reception module 5710 may include an audible target selection module 5714 which may be configured to allow the user to select a target using audible commands, without requiring physical interaction with a device.

Referring again to FIG. 1, e.g., FIG. 1-E, in an embodiment, user device 5700 may include selected target transmission module 5720. Selected target transmission module 5720 may be configured to take the target selected by the user, and transmit the selected target to the server 4000.

Referring now to FIG. 1-P, FIG. 1-P depicts a server 4000 of the MUVIA system according to embodiments. In an embodiment, server 4000 may include a selected target reception module 4310. Selected target reception module 4310 may receive the selected target from the user device 3700. In an embodiment, server 4000 may provide all or most of the data that facilitates the selection of the target, that is, the images and the interface, which may be provided, e.g., through a web portal.

Referring again to FIG. 1-P, in an embodiment, server 4000 may include a selected image pre-processing module 4320. Selected image pre-processing module 4320 may perform one or more tasks of pre-processing the image, some of which are described herein for exemplary purposes. For example, in an embodiment, selected image pre-processing module 4320 may include a resolution determination module 4322 which may be configured to determine the resolution for the image in order to show the target (and here, resolution is merely a stand-in for any facet of the image, e.g., color depth, size, shadow, pixelation, filter, etc.). In an embodiment, selected image pre-processing module 4320 may include a cached pixel fill-in module 4324. Cached pixel fill-in module 4324 may be configured to manage which portions of the requested image are recovered from a cache, and which are updated, in order to improve performance. For example, if a view of a street is requested, certain features of the street (e.g., buildings, trees, etc., may not need to be retrieved each time, but can be filled in with a cached version, or, in another embodiment, can be filled in by an earlier version. A check can be done to see if a red parked car is still in the same spot as it was in an hour ago; if so, that part of the image may not need to be updated. Using lower resolution/prior images stored in a memory 4215, as well as other image processing techniques, cached pixel fill-in module determines which portions of the image do not need to be retrieved, thus reducing bandwidth load on the connection between the array local processing module 3600 and the server 4000.

Referring again to FIG. 1-P, in an embodiment, selected image pre-processing module 4320 of server 4000 may include a static object obtaining module 4326, which may operate similarly to cached pixel fill-in module 4324. For example, as in the example shown in FIG. 1-B, static object obtaining module 4326 may obtain prior versions of static objects, e.g., buildings, trees, fixtures, landmarks, etc., which may save bandwidth load on the connection between the array local processing module 3600 and the server 4000.

Referring again to FIG. 1-P, in an embodiment, pixel information transmission to ISA module 4330 may transmit the request for pixels (e.g., an image, after the pre-processing) to the array local processing module 3600 (e.g., as shown in FIGS. 1-Z and 1-AI, with the downward extending dataflow arrow).

Referring now to FIGS. 1-Z and 1-AI, in an embodiment, an array local processing module 3600, that may be connected by a higher bandwidth connection to an image sensor array 3200, may be present.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3605 to the array local storage and processing module 3600. In an embodiment, array local storage and processing module 3600 is integrated into the image sensor array. In another embodiment, the array local storage and processing module 3600 is separate from, but directly connected to (e.g., via a USB 3.0 cable) to the image sensor array 3200. It is noted that "higher bandwidth communication 3605" does not require a specific amount of bandwidth, but only that the bandwidth for this communication is relatively higher than the bandwidth communication from the array local processing module 3600 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AJ and FIG. 1-Z, the image sensor array 3200 may capture an image that is received by image capturing module 3605. Image capturing module 3605 may take the captured image and compare it to a consolidated user request, e.g., which is provided by a consolidated user request reception module 3610. Consolidated user request reception module 3610 may receive the communication from server 4000 regarding which pixels of the image have been requested. Through use of the consolidated user request and the captured image, pixel selection module 3620 may select the pixels that have been specifically requested by the user, and mark those pixels for transmission back to the server.

After the pixels to be kept are identified, the other pixels that are not to be kept are removed, e.g., decimated at unused pixel decimation module 3630. In an embodiment, these pixels are simply discarded, e.g., not stored in a long-term memory, that is removed to a digital trash 3617. In another embodiment, some or all of these pixels are stored in a local memory, e.g., local memory 3615. From here, these pixels may be transmitted to various locations at off-peak times, may be kept for image processing by the array local processing module 3600, or may be subject to other manipulations or processing separate from the user requests. In an embodiment, unused pixel decimation module may include or communicate with a lower resolution module 3614, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AJ, the selected pixels then may be transmitted to the server 4000 using selected pixel transmission module 3640. Selected pixel transmission module 3640 may include any transmission equipment necessary, e.g., cellular radio, wireless adapter, and the like, depending on the format of communication. In an embodiment, only those pixels which have been requested are transmitted to the server via lower-bandwidth communication 3610. Similarly to lower-bandwidth communication 3615, the lower-bandwidth communication 3610 does not refer to a specific amount of bandwidth, just that the amount of bandwidth is relatively lower than higher-bandwidth communication 3605.

It is noted that more pixels than what are specifically requested by the user may be transmitted, in certain embodiments. For example, the array local processing module 3600 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3600 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-P, in an embodiment, server 4000 may include image receiving from ISA module 4340. Image receiving from ISA module 4340 may receive the image data from the array local processing module 3600 (e.g., in the arrow coming "north" from FIG. 1-AJ via FIG. 1-Z). The image may include the pixels that were requested from the image sensor array 3200. In an embodiment, server 4000 also may include received image post-processing module 4350, which may, among other post-processing tasks, fill in objects and pixels into the image that were determined not to be needed by selected image pre-processing module 4320, as previously described. In an embodiment, server 4000 may include received image transmission to user device module 4360, which may be configured to transmit the requested image to the user device 5700. Requested image transmission to user device module 4260 may include components necessary to communicate with user device 5700 and may, in some embodiments, share components with one or more other modules of server 4000, e.g., a network interface, or a wireless antenna.

Referring now again to FIG. 1-F, user device 5700 may include a server image reception module 5730. Server image reception module 5730 may receive an image from sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-F.

In an embodiment, as shown in FIGS. 1-F and 1-G, server image reception module 5730 may include an audio stream reception module 5732 and a video stream reception module 5734. In an embodiment, as discussed throughout this application, the MUVIA system may capture still images, video, and also sound, as well as other electromagnetic waves and other signals and data. In an embodiment, the audio signals and the video signals may be handled together, or they may be handled separately, as separate streams. Although not every module in the instant diagram separately shows audio streams and video streams, it is noted here that all implementations of MUVIA contemplate both audio and video coverage, as well as still image and other data collection.

Referring now to FIG. 1-G, which shows another portion of user device 5700, FIG. 1-G may include a display 5755 and a memory 5765, which may be used to facilitate presentation and/or storage of the received images.

Referring now to FIG. 4, in an embodiment, user device 5700 may carry out an operation 400, as shown in FIG. 4. Operation 400 may include one or more steps, including, in some embodiments, step 402 depicting accepting input of a request for a particular image of the scene, step 404 depicting transmitting the request for the particular image of the scene to a multi-image-sensor array that is configured to capture a captured image that is larger than the particular image, step 406 depicting receiving only the particular image from the multi-image sensor array, and step 408 depicting presenting the received particular image 408.

FIGS. 1-H, 1-R, 1-AA, and 1-AB show an embodiment of a MUVIA implementation. For example, referring now to FIG. 1-H, FIG. 1-H shows an embodiment of a user device 5800. For exemplary purposes, the user device 5800 may be an augmented reality device that shows a user looking down a "street" at which the user is not actually present, e.g., a "virtual tourism" where the user may use their augmented reality device (e.g., googles, e.g., an Oculus Rift-type headgear device) which may be a wearable computer. It is noted that this embodiment is not limited to wearable computers or augmented reality, but as in all of the embodiments described in this disclosure, may be any device. The use of a wearable augmented/virtual reality device is merely used to for illustrative and exemplary purposes.

In an embodiment, user device 5800 may have a field of view 5810, as shown in FIG. 1-H. The field of view for the user 5810 may be illustrated in FIG. 1-H as follows. The most internal rectangle, shown by the dot hatching, represents the user's "field of view" as they look at their "virtual world." The second most internal rectangle, with the straight line hatching, represents the "nearest" objects to the user, that is, a range where the user is likely to "look" next, by turning their head or moving their eyes. In an embodiment, this area of the image may already be loaded on the device, e.g., through use of a particular codec, which will be discussed in more detail herein. The outermost rectangle, which is the image without hatching, represents further outside the user's viewpoint. This area, too, may already be loaded on the device. By loading areas where the user may eventually look, the system can reduce latency and make a user's motions, e.g., movement of head, eyes, and body, appear "natural" to the system.

Referring now to FIGS. 1-AA and 1-AB, these figures show an array local processing module 3700 that is connected to an image sensor array 3200 (e.g., as shown in FIG. 1-AK, and "viewing" a city as shown in FIG. 1-AJ). The image sensor array 3200 may operate as previously described in this document. In an embodiment, array local processing module 3700 may include a captured image receiving module 3710, which may receive the entire scene captured by the image sensor array 3200, through the higher-bandwidth communication channel 3505. As described previously in this application, these pixels may be "cropped" or "decimated" into the relevant portion of the captured image, as described by one or more of the user device 5800, the server 4000, and the processing done at the array local processing module 3700. This process may occur as previously described. The relevant pixels may be handled by relevant portion of captured image receiving module 3720.

Referring now to FIG. 1-AB, in an embodiment, the relevant pixels for the image that are processed by relevant portion of captured image receiving module 3720 may be encoded using a particular codec at relevant portion encoding module 3730. In an embodiment, the codec may be configured to encode the innermost rectangle, e.g., the portion that represents the current user's field of view, e.g., portion 3716, at a higher resolution, or a different compression, or a combination of both. The codec may be further configured to encode the second rectangle, e.g., with the vertical line hashing, e.g., portion 3714, at a different resolution and/or a different (e.g., a higher) compression. Similarly, the outermost portion of the image, e.g., the clear portion 3716, may again be coded at still another resolution and/or a different compression. In an embodiment, the codec itself handles the algorithm for encoding the image, and as such, in an embodiment, the codec may include information about user device 5800.

As shown in FIG. 1-AB, the encoded portion of the image, including portions 3716, 3174, and 3712, may be transmitted using encoded relevant portion transmitting module 3740. It is noted that "lower compression," "more compression," and "higher compression," are merely used as one example for the kind of processing done by the codec. For example, instead of lower compression, a different sampling algorithm or compacting algorithm may be used, or a lossier algorithm may be implemented for various parts of the encoded relevant portion.

Referring now to FIG. 5, FIG. 5 shows an exemplary process 500 that may be carried out by array local processing module 3700. It is noted that exemplary process 500 may be carried out by any or all of array local processing module 3700, server 4000, and user device 5800, but for illustrative purposes is shown in FIG. 1 as occurring at array local processing module 3700. Exemplary process 500 may include one or more of step 502 depicting capturing an image that is larger than a field of view of a device configured to receive the captured image, step 504 depicting encoding the captured image such that a first portion of the image is encoded at a first resolution and a second portion of the image is encoded at a second resolution that is lower than the first resolution, wherein the first portion of the image represents the field of view of the device and the second portion represents at least one adjacent region to the field of view of the device, and step 506 depicting transmitting the encoded image to a receiving device configured to decode the captured image and present the first portion of the image to a client of the device.

Referring now to FIG. 1-R, FIG. 1-R depicts a server 4000 in a MUVIA system according to an embodiment. For example, as shown in FIG. 1-R, server 4000 may include, in addition to portions previously described, an encoded image receiving module 4410. Encoded image receiving module 4410 may receive the encoded image, encoded as previously described, from encoded relevant portion transmitting module 3740 of array local processing module 3700.

Referring again to FIG. 1-R, server 4000 may include an encoded image transmission controlling module 4420. Encoded image transmission controlling module 4420 may transmit portions of the image to the user device 5800. depending on the bandwidth and the particulars of the user device, the server may send all of the encoded image to the user device, and let the user device decode the portions as needed, or may decode the image and send portions in piecemeal, or with a different encoding, depending on the needs of the user device, and the complexity that can be handled by the user device.

Referring now to FIG. 6, in another embodiment, the user device, e.g., user device 5800, the server 4000, and the array local processing module 3700 may use a messaging system to perform latency hiding, either in combination with the codec described above or as a separate implementation. FIGS. 6A-6C show a "message flow" view of how messages and cached images are passed between the user device 5800 (indicated as "client" and/or "display" and/or "viewer" in FIG. 6A), the server 4000 (indicated as "server" and/or "cloud" in FIG. 6A) and the array local processing module 3700 (indicated as "camera" in FIG. 6A).

Referring again to FIG. 1-H, user device 5800 may include an encoded image transmission receiving module 5720, which may be configured to receive the image that is coded in a particular way, e.g., as will be disclosed in more detail herein. FIG. 1-H also may include an encoded image processing module 5830 that may handle the processing of the image, that is, encoding and decoding portions of the image, or other processing necessary to provide the image to the user.

Referring now to FIG. 1-AL, FIG. 1-AL shows an implementation of an Application Programming Interface (API) for the various MUVIA components. Specifically, image sensor array API 7800 may include, among other elements, a programming specification 7810, that may include, for example, libraries, classes, specifications, templates, or other coding elements that generally make up an API, and an access authentication module 7820 that governs API access to the various image sensor arrays. The API allows third party developers to access the workings of the image sensor array and the array local processing module 3700, so that the third party developers can write applications for the array local processing module 3700, as well as determine which data captured by the image sensor array 3200 (which often may be multiple gigabytes or more of data per second) should be kept or stored or transmitted. In an embodiment, API access to certain functions may be limited. For example, a tiered system may allow a certain number of API calls to the MUVIA data per second, per minute, per hour, or per day. In an embodiment, a third party might pay fees or perform a registration that would allow more or less access to the MUVIA data. In an embodiment, the third party could host their application on a separate web site, and let that web site access the image sensor array 3200 and/or the array local processing module 3700 directly.

Referring again to FIG. 1, FIGS. 1-I, 1-J, 1-S, 1-T, 1-AC, 1-AD, 1-AM, and 1-AN, in an embodiment, show a MUVIA implementation that allows insertion of advertising (or other context-sensitive material) into the images displayed to the user.

Referring again to FIG. 1-I, in an embodiment, user device 5900 may include a user selection accepting module 5910. User selection accepting module 5910 may be configured to receive user input about what the user wants to see. For example, as shown in FIG. 1-I in the exemplary interface 5912, the user selection accepting module 5910 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the "user selection" facilitated by the user selection accepting module 5910 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-I, in an embodiment, user device 5900 may include a user selection transmitting module 5920. The user selection transmitting module 5920 may take the user selection from user selection transmitting module 5920, and transmit the selection to the server 4000. The transmission may include some pre-processing, for example, the user device 5900 may determine the size and parameters of the image prior to sending the request to the server 4000, or that processing may be handled by the server 4000. Following the thick-line arrow leftward from user selection transmitting module 5920 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-I, FIG. 1-I also includes a selected image receiving module 5930 and a user selection presenting module 5940, which will be discussed in more detail herein, with respect to the dataflow of this embodiment.

Referring now to FIG. 1-T (graphically represented as "down" and "to the right" of FIG. 14), in an embodiment, a server 4000 may include a selected target reception module 4510. In an embodiment, selected target reception module 4510 of server 4000 may receive the selected target from the user device 5900. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-T, in an embodiment, server 4000 may include selected image pre-processing module 4320. Selected image pre-processing module 4320 may perform one or more tasks of pre-processing the image, some of which have been previously described with respect to other embodiments. In an embodiment, server 4000 also may include pixel information transmission to ISA module 4330 configured to transmit the image request data to the image search array 3200, as has been previously described.

Referring now to FIGS. 1-AD and 1-AN, array local processing module 3700 may be connected to an image sensor array 3200 through a higher-bandwidth communication link 3505, e.g., a USB or PCI port. In an embodiment, image sensor array 3200 may include a request reception module 3710. Request reception module 3710 may receive the request for an image from the server 4000, as previously described. Request reception module 3710 may transmit the data to a pixel selection module 3720, which may receive the pixels captured from image sensor array 3200, and select the ones that are to be kept. That is, in an embodiment, through use of the (sometimes consolidated) user requests and the captured image, pixel selection module 3620 may select the pixels that have been specifically requested by the user, and mark those pixels for transmission back to the server.

After the pixels to be kept are identified, the other pixels that are not to be kept are removed, e.g., decimated at unused pixel decimation module 3730. In an embodiment, these pixels are simply discarded, e.g., not stored in a long-term memory, that is removed to a digital trash 3717. In another embodiment, some or all of these pixels are stored in a local memory, e.g., local memory 3715. From here, these pixels may be transmitted to various locations at off-peak times, may be kept for image processing by the array local processing module 3700, or may be subject to other manipulations or processing separate from the user requests, as described in previous embodiments. In an embodiment, unused pixel decimation module 3730 may be used to transmit a lower-resolution version of more of the image (e.g., an entire scene, or more of the field of view surrounding the target) to the server 4000, so that the server 4000 may accurately determine which images are required to fulfill the request of the user.

Referring again to FIG. 1-AN, the selected pixels then may be transmitted to the server 4000 using selected pixel transmission module 3740. Selected pixel transmission module 3740 may include any transmission equipment necessary, e.g., cellular radio, wireless adapter, and the like, depending on the format of communication. In an embodiment, only those pixels which have been requested are transmitted to the server via lower-bandwidth communication 3710. Similarly to lower-bandwidth communication 3715, the lower-bandwidth communication 3710 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3700 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3700 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-T, in an embodiment, server 4000 may include received image post-processing module 4550. 4340. Received image post-processing module 4550 may receive the image data from the array local processing module 3700 (e.g., in the arrow coming "north" from FIG. 1-AN via FIG. 1-AD). The image may include the pixels that were requested from the image sensor array 3200.

In an embodiment, server 4000 also may include advertisement insertion module 4560. Advertisement insertion module 4560 may insert an advertisement into the received image. The advertisement may be based one or more of the contents of the image, a characteristic of a user or the user device, or a setting of the advertisement server component 7700 (see, e.g., FIG. 1-AC, as will be discussed in more detail herein). The advertisement insertion module 4560 may place the advertisement into the image using any known image combination techniques, or, in another embodiment, the advertisement image may be in a separate layer, overlay, or any other data structure. In an embodiment, advertisement insertion module 4560 may include context-based advertisement insertion module 4562, which may be configured to add advertisements that are based on the context of the image. For example, if the image is a live street view of a department store, the context of the image may show advertisements related to products sold by that department store, e.g., clothing, cosmetics, or power tools.

Referring again to FIG. 1-T, server 4000 may include a received image with advertisement transmission to user device module 4570 configured to transmit the image 5900 Received image with advertisement transmission to user device module 4570 may include components necessary to communicate with user device 5900 and may, in some embodiments, share components with one or more other modules of server 4000, e.g., a network interface, or a wireless antenna.

Referring again to FIG. 1-I, user device 5900 may include a selected image receiving module 5930, which may receive the pixels that were sent by the server 4000, and user selection presenting module 5940, which may display the requested pixels to the user, including the advertisement, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-I.

Referring now to FIG. 1-AC, FIG. 1-AC shows an advertisement server component 7700 configured to deliver advertisements to the server 4000 for insertion into the images prior to delivery to the user. In an embodiment, advertisement server component 7700 may be integrated with server 4000. In another embodiment, advertisement server component may be separate from server 4000 and may communicate with server 4000. In yet another embodiment, rather than interacting with server 4000, advertisement server component 7700 may interact directly with the user device 5900, and insert the advertisement into the image after the image has been received, or, in another embodiment, cause the user device to display the advertisement concurrently with the image (e.g., overlapping or adjacent to). In such embodiments, some of the described modules of server 4000 may be incorporated into user device 5900, but the functionality of those modules would operate similarly to as previously described.

Referring again to FIG. 1-AC, in an embodiment, advertisement server component 7700 may include a user data collection module 7705. User data collection module 7705 may collect data from user device 5900, and use that data to drive placement of advertisements (e.g., based on a user's browser history, e.g., to sports sites, and the like).

Referring again to FIG. 1-AC, in an embodiment, advertisement server component 7700 may include advertisement database 7715 which includes advertisements that are ready to be inserted into images. In an embodiment, these advertisements may be created on the fly.

Referring again to FIG. 1-AC, in an embodiment, advertisement server component 7700 may include an advertisement request reception module 7710 which receives a request to add an advertisement into the drawing (the receipt of the request is not shown to ease understanding of the drawings). In an embodiment, advertisement server component 7700 may include advertisement selection module 7720, which may include an image analysis module 7722 configured to analyze the image to determine the best context-based advertisement to place into the image. In an embodiment, that decision may be made by the server 4000, or partly at the server 4000 and partly at the advertisement server component 7700 (e.g., the advertisement server component may have a set of advertisements from which a particular one may be chosen). In an embodiment, various third parties may compensate the operators of server component 7700, server 4000, or any other component of the system, in order to receive preferential treatment.

Referring again to FIG. 1-AC, in an embodiment, advertisement server component 7700 may include a selected advertisement transmission module 7730, which may transmit the selected advertisement (or a set of selected advertisements) to the server 4000. In an embodiment, selected advertisement transmission module 7730 may send the complete image with the advertisement overlaid, e.g., in an implementation in which the advertisement server component 7700 also handles the placement of the advertisement. In an embodiment in which advertisement server component 7700 is integrated with server 4000, this module may be an internal transmission module, as may all such transmission/reception modules.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:
1. An image capture device comprising:
an array of more than one image sensor;
computer readable memory bearing one or more program instructions;
a wireless communication interface; and at least one computer processor configured to execute the one or more program instructions to perform operations including at least:
  capturing a scene through use of the array of more than one image sensor;
  receiving a request via the wireless communication interface for a particular zoom level view of the scene;
  identifying one or more pixels of the scene that correspond to the particular zoom level view;
  decimating prior to transmission at least some of the one or more pixels that correspond to the particular zoom level view to result in one or more remaining pixels that correspond to the particular zoom level view, the decimating being to an extent that depends upon a field of view size of the particular zoom level view; and
  transmitting via the wireless communication interface the one or more remaining pixels that correspond to the particular zoom level view.

2. An image capture device comprising:
an array of more than one image sensor;
computer readable memory bearing one or more program instructions;
a wireless communication interface; and
one or more computer processors configured to execute the one or more program instructions to perform operations including at least:
  capturing a scene through use of the array of more than one image sensor;
  receiving a request via the wireless communication interface for a particular view of the scene;
  identifying one or more pixels of the scene that correspond to the request for the particular view of the scene;
  removing at least some other pixels from the scene that do not correspond to the request for the particular view of the scene;
  transmitting via the wireless communication interface the one or more pixels of the scene that correspond to the request for the particular view of the scene; and
  transmitting via the wireless communication interface during an off-peak period at least some of the other pixels removed from the scene that do not correspond to the request for the particular view of the scene.

3. The image capture device of claim 1, wherein the receiving a request via the wireless communication interface for a particular zoom level view of the scene comprises:
  receiving a request via the wireless communication interface from a client device for a particular zoom level view of the scene.

4. The image capture device of claim 1, wherein the at least one computer processor is further configured to perform an operation comprising:
  combining the request for the particular zoom level view of the scene with a further request of a different requestor.

5. The image capture device of claim 1, wherein the at least one computer processor is further configured to perform an operation comprising:
  removing one or more redundant pixels that have already been transmitted.

6. The image capture device of claim 1, wherein the array of more than one image sensor comprises:
  an array of more than one image sensor arranged in a row.

7. The image capture device of claim 1, wherein the array of more than one image sensor comprises:
  an array of more than one image sensor mounted on a moving platform.

8. The image capture device of claim 1, wherein the at least one computer processor is further configured to perform an operation comprising:
  transmitting one or more other portions of the scene to reduce latency in an event at least some of the one or more other portions are subsequently requested.

9. The image capture device of claim 1, wherein the at least one computer processor is further configured to perform operations comprising:
  comparing the one or more pixels of the scene with previously transmitted imagery to identify one or more unchanged pixels corresponding to one or more static objects; and
  removing the one or more unchanged pixels corresponding to the one or more static objects from the one or more pixels.

10. The image capture device of claim 1, wherein the at least one computer processor is further configured to perform an operation comprising:
  identifying one or more overlapping pixels of the one or more pixels that correspond to one or more contemporaneous requests; and
  removing the one or more overlapping pixels from the one or more pixels.

11. The image capture device of claim 1, wherein the at least one computer processor is further configured to perform an operation comprising:
  hosting a third-party application that obtains the scene and determines data to keep or transmit.

12. The image capture device of claim 1, wherein the transmitting via the wireless communication interface the one or more remaining pixels that correspond to the particular zoom level view comprises:
  transmitting via the wireless communication interface the one or more remaining pixels that correspond to the particular zoom level view, in real-time or near-real-time with capture of the scene.

13. The image capture device of claim 1, wherein the transmitting via the wireless communication interface the one or more remaining pixels that correspond to the particular zoom level view comprises:
  transmitting via the wireless communication interface to a user device the one or more remaining pixels that correspond to the particular zoom level view.

14. The image capture device of claim 1, wherein the decimating prior to transmission at least some of the one or more pixels that correspond to the particular zoom level view to result in one or more remaining pixels that correspond to the particular zoom level view, the decimating being to an extent that depends upon a field of view size of the particular zoom level view comprises:
  decimating prior to transmission at least some of the one or more pixels that correspond to the particular zoom level view to result in one or more remaining pixels that correspond to the particular zoom level view, the decimating being to an extent that depends upon a field of view size of the particular zoom level view and that depends upon a screen resolution of a requesting device.

15. The image capture device of claim 1, wherein the decimating prior to transmission at least some of the one or more pixels that correspond to the particular zoom level view to result in one or more remaining pixels that correspond to the particular zoom level view, the decimating being to an extent that depends upon a field of view size of the particular zoom level view comprises:

decimating by trashing, removing, or storing prior to transmission at least some of the one or more pixels that correspond to the particular zoom level view to result in one or more remaining pixels that correspond to the particular zoom level view, the decimating being to an extent that depends upon a field of view size of the particular zoom level view.

16. The image capture device of claim 1, wherein the at least one computer processor is further configured to perform an operation comprising:

transmitting via the wireless communication interface during one or more off-peak times at least some imagery that does not correspond to the particular zoom level view.

17. The image capture device of claim 1, wherein the at least one computer processor is further configured to perform an operation comprising:

adding content to the one or more pixels, the content being selected based on a subject matter associated with the one or more pixels.

18. The image capture device of claim 1, wherein the receiving a request via the wireless communication interface for a particular zoom level view of the scene comprises:

receiving a voice request via the wireless communication interface for a particular zoom level view of the scene.

19. The image capture device of claim 1, wherein the receiving a request via the wireless communication interface for a particular zoom level view of the scene comprises:

receiving a request via the wireless communication interface for a particular zoom level view of the scene that corresponds to a selected person, object, or animal.

20. The image capture device of claim 1, wherein the receiving a request via the wireless communication interface for a particular zoom level view of the scene comprises:

receiving a request of an augmented reality device via the wireless communication interface for a particular zoom level view and pan view of the scene.

21. The image capture device of claim 1, wherein the decimating prior to transmission at least some of the one or more pixels that correspond to the particular zoom level view to result in one or more remaining pixels that correspond to the particular zoom level view, the decimating being to an extent that depends upon a field of view size of the particular zoom level view comprises:

decimating prior to transmission at least some of the one or more pixels that correspond to the particular zoom level view to result in one or more remaining pixels that correspond to the particular zoom level view, the decimating being to an extent that is proportional to a field of view size of the particular zoom level view.

22. The image capture device of claim 1, wherein the at least one computer processor is further configured to perform an operation comprising:

transmitting reduced resolution imagery corresponding to the scene to enable selection of the particular zoom level view.

23. The image capture device of claim 1, wherein the capturing a scene through use of the array of more than one image sensor comprises:

capturing at least one of the following types of scenes through use of the array of more than one image sensor: cityscape, event, nature, or topographical.

24. The image capture device of claim 1, wherein the capturing a scene through use of the array of more than one image sensor comprises:

capturing a scene through use of the array of more than one image sensor, the scene including more image data per unit of time than can be transmitted via the wireless communication interface within the unit of time.

25. The image capture device of claim 1, wherein the receiving a request via the wireless communication interface for a particular zoom level view of the scene comprises:

receiving from a server a request via the wireless communication interface for a particular zoom level view of the scene.

26. The image capture device of claim 1, wherein the transmitting via the wireless communication interface the one or more remaining pixels that correspond to the particular zoom level view comprises:

transmitting via the wireless communication interface the one or more remaining pixels that correspond to the particular zoom level view, wherein at least some other imagery is used to gap-fill the one or more remaining pixels at a server prior to communication to a user device.

27. The image capture device of claim 1, wherein the identifying one or more pixels of the scene that correspond to the particular zoom level view comprises:

identifying one or more pixels of the scene that correspond to the particular zoom level view and that correspond to a specified target.

28. The image capture device of claim 1, wherein the receiving a request via the wireless communication interface for a particular zoom level view of the scene comprises:

receiving a request via the wireless communication interface for a particular zoom level view of a specified target.

* * * * *